United States Patent
Sharma et al.

(10) Patent No.: US 10,353,474 B2
(45) Date of Patent: *Jul. 16, 2019

(54) UNIFIED VIRTUAL REALITY PLATFORM

(71) Applicant: Microsoft Technology Licensing, LLC, Redmond, WA (US)

(72) Inventors: Vishal Sharma, Los Altos, CA (US); Elhum Amjadi, Foster City, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 36 days.

This patent is subject to a terminal disclaimer.

(21) Appl. No.: 15/279,215

(22) Filed: Sep. 28, 2016

(65) Prior Publication Data

US 2017/0090589 A1 Mar. 30, 2017

Related U.S. Application Data

(60) Provisional application No. 62/233,601, filed on Sep. 28, 2015.

(51) Int. Cl.
*G06F 3/01* (2006.01)
*G06F 3/16* (2006.01)
(Continued)

(52) U.S. Cl.
CPC .............. *G06F 3/017* (2013.01); *G06F 3/011* (2013.01); *G06F 3/167* (2013.01); *G06F 9/541* (2013.01);
(Continued)

(58) Field of Classification Search
CPC ......... B60T 8/26; G01C 21/367; G01C 21/26; G01C 21/3638; G01C 21/3664;
(Continued)

(56) References Cited

U.S. PATENT DOCUMENTS 6,529,909 B1 * 3/2003 Bowman-Amuah ........................ G06F 17/30569
6,549,949 B1 * 4/2003 Bowman-Amuah ... H04L 69/08 709/236

(Continued)

FOREIGN PATENT DOCUMENTS

EP 1677218 A2 7/2006
WO 2014197730 A1 12/2014

OTHER PUBLICATIONS

Burgy et al., Zebu A Language Based Approach for Network Protocol Message processing, 2011, IEEE, p. 575-591 (Year: 2011).*

(Continued)

*Primary Examiner* — McDieunel Marc

(57) ABSTRACT

Techniques for providing a unified computational platform for implementing virtual reality systems. In an aspect, a virtual reality (VR) client includes input and output modules for generating a VR user experience. The client also incorporates an assistant interface that couples the input and output modules to an assistant server using a semantic information interchange language (SIIL). The assistant server includes a command inference block for converting user-input SIIL messages to command-input SIIL messages, thereby encoding user VR inputs into a general command set that is recognized and processed by both VR and non-VR modules. Further aspects include techniques for seamless integration between virtual environments and joint VR sessions supporting multiple users.

20 Claims, 13 Drawing Sheets

(51) Int. Cl.
*H04L 29/08* (2006.01)
*H04L 29/06* (2006.01)
*G06F 9/54* (2006.01)
*G06Q 30/06* (2012.01)

(52) U.S. Cl.
CPC .............. *H04L 67/10* (2013.01); *H04L 67/38* (2013.01); *G06F 2203/0381* (2013.01); *G06Q 30/0601* (2013.01)

(58) Field of Classification Search
CPC .......... G06F 3/017; G06F 3/011; G06F 3/167; G06F 9/541; G06F 2203/0381; G06Q 30/0601; H04L 67/38
See application file for complete search history.

(56) References Cited

U.S. PATENT DOCUMENTS

| | | | |
|---|---|---|---|
| 7,155,672 | B1 | 12/2006 | Adler et al. |
| 7,353,176 | B1 | 4/2008 | Baray et al. |
| 7,739,407 | B1 * | 6/2010 | Pakkala ............ G06F 17/30905 709/246 |
| 8,495,678 | B2 | 7/2013 | Perlman et al. |
| 8,661,496 | B2 | 2/2014 | Perlman et al. |
| 8,693,207 | B2 | 4/2014 | Yang et al. |
| 8,700,006 | B2 | 4/2014 | Ni |
| 9,108,107 | B2 | 8/2015 | Perlman et al. |
| 9,111,214 | B1 * | 8/2015 | Sharma ................... G06N 3/006 |
| 9,183,560 | B2 | 11/2015 | Abelow |
| 9,225,831 | B2 | 12/2015 | Kim et al. |
| 9,459,894 | B2 | 10/2016 | Bobroff et al. |
| 9,461,943 | B2 | 10/2016 | Narasimhan et al. |
| 9,489,616 | B2 | 11/2016 | Sharma et al. |
| 9,661,105 | B2 | 5/2017 | Sharma et al. |
| 9,692,855 | B2 | 6/2017 | Sharma et al. |
| 9,697,202 | B2 | 7/2017 | Sharma et al. |
| 9,703,778 | B2 | 7/2017 | Sharma et al. |
| 10,031,911 | B2 | 7/2018 | Sharma et al. |
| 2003/0105827 | A1 | 6/2003 | Tan et al. |
| 2004/0030604 | A1 | 2/2004 | Young |
| 2004/0030640 | A1 | 2/2004 | Mahnken et al. |
| 2004/0104935 | A1 | 6/2004 | Williamson et al. |
| 2004/0260820 | A1 | 12/2004 | Bearman |
| 2005/0027708 | A1 | 2/2005 | Mueller et al. |
| 2007/0237135 | A1 | 10/2007 | Trevallyn-Jones et al. |
| 2007/0288467 | A1 | 12/2007 | Strassner et al. |
| 2008/0201723 | A1 | 8/2008 | Bottaro et al. |
| 2009/0234638 | A1 | 9/2009 | Ranjan et al. |
| 2009/0254912 | A1 | 10/2009 | Roundtree et al. |
| 2010/0257539 | A1 | 10/2010 | Narayanan et al. |
| 2012/0016678 | A1 | 1/2012 | Gruber et al. |
| 2012/0208564 | A1 | 8/2012 | Clark et al. |
| 2012/0249416 | A1 | 10/2012 | Maciocci et al. |
| 2013/0219459 | A1 | 8/2013 | Bradley |
| 2013/0268260 | A1 | 10/2013 | Lundberg et al. |
| 2013/0321431 | A1 | 12/2013 | Chen et al. |
| 2013/0321441 | A1 | 12/2013 | Pahwa et al. |
| 2013/0321442 | A1 | 12/2013 | Van Os et al. |
| 2013/0321443 | A1 | 12/2013 | Pahwa et al. |
| 2013/0321450 | A1 | 12/2013 | Hultquist et al. |
| 2013/0321456 | A1 | 12/2013 | Hultquist et al. |
| 2013/0321472 | A1 | 12/2013 | Piemonte et al. |
| 2013/0324154 | A1 | 12/2013 | Raghupathy et al. |
| 2014/0028799 | A1 | 1/2014 | Kuffner et al. |
| 2014/0153489 | A1 | 6/2014 | Perras et al. |
| 2014/0162693 | A1 | 6/2014 | Wachter et al. |
| 2014/0164532 | A1 | 6/2014 | Lynch et al. |
| 2014/0214398 | A1 | 7/2014 | Sanders et al. |
| 2014/0269678 | A1 | 9/2014 | Mcgee et al. |
| 2014/0341109 | A1 | 11/2014 | Cartmell et al. |
| 2014/0380182 | A1 | 12/2014 | Lu et al. |
| 2015/0094046 | A1 | 4/2015 | Jung et al. |
| 2015/0163102 | A1 | 6/2015 | Staykoff |
| 2015/0213355 | A1 | 7/2015 | Sharma et al. |
| 2015/0278678 | A1 | 10/2015 | Sharma et al. |
| 2015/0278679 | A1 | 10/2015 | Sharma et al. |
| 2016/0269904 | A1 | 9/2016 | Sharma et al. |
| 2017/0024378 | A1 | 1/2017 | Sharma et al. |
| 2017/0093781 | A1 * | 3/2017 | Sharma ................... H04L 51/18 |
| 2018/0307682 | A1 | 10/2018 | Sharma et al. |

OTHER PUBLICATIONS

Marsic, Adaptive collaboration for wired adn wireless platforms, 2001, IEEE, p. 26-35 (Year: 2001).*
Valetto et al, Using process technology to control and coordinate software adaptation, 2003, IEEE, p. 1-9 (Year: 2003).*
Mulligan et al., A comparison of SOAP and REST implimentations of a service based interaction independence middleware framework, 2009, IEEE, p. 1423-1432 (Year: 2009).*
"International Search Report and Written Opinion Issued in PCT Application No. PCT/US2016/054249", dated Dec. 20, 2016, 14 Pages.
"International Preliminary Report on Patentability Issued in PCT Application No. PCT/US2016/054249", dated Dec. 11, 2017, 10 Pages.
"Second Written Opinion Issued in PCT Application No. PCT/US2016/054249", dated Sep. 1, 2017, 9 Pages.
"Non Final Office Action Issued in U.S. Appl. No. 14/608,786", dated Mar. 17, 2015, 22 Pages.
"Non-Final Office Action Issued in U.S. Appl. No. 14/738,104", dated Apr. 14, 2016, 21 Pages.
"Notice of Allowance Issued in U.S. Appl. No. 14/738,104", dated Jul. 13, 2016, 9 Pages.
"Non-Final Office Action Issued in U.S. Appl. No. 14/738,121", dated May 2, 2016, 8 Pages.
"Notice of Allowance Issued in U.S. Appl. No. 14/738,121", dated Mar. 13, 2017, 7 Pages.
"Non Final Office Action Issued in U.S. Appl. No. 14/966,212", dated May 27, 2016, 25 Pages.
"Non Final Office Action Issued in U.S. Appl. No. 15/158,718", dated Dec. 9, 2016, 8 Pages.
"Non-Final Office Action Issued in U.S. Appl. No. 15/160,038", dated Nov. 25, 2016, 9 Pages.
"Non-Final Office Action Issued in U.S. Appl. No. 15/173,053", dated Jul. 24, 2017, 31 Pages.
"Non Final Office Action Issued in U.S. Appl. No. 15/279,240", dated Aug. 10, 2018, 18 Pages.
"Non Final Office Action Issued in U.S. Appl. No. 15/287,722", dated Nov. 30, 2017, 14 Pages.
"Non-Final Office Action Issued in U.S. Appl. No. 15/489,741", dated Aug. 31, 2017, 11 Pages.
"Notice of Allowance Issued in U.S. Appl. No. 15/489,741", dated Dec. 13, 2017, 10 Pages.
"Search Report Issued in European Patent Application No. 15867717.9", dated Jul. 11, 2018, 7 Pages.
Ameiri, et al., "Mobile Arabic Sign Language", In Proceedings of 6th International Conference for Internet Technology and Secured Transactions, Dec. 11, 2011, pp. 363-367.
Hays, et al., "Mobile Device to Cloud Co-Processing of ASL Finger Spelling to Text Conversion", In IEEE Western New York Image Processing Workshop, Nov. 22, 2013, pp. 39-43.
Jimenez, et al., "CCENet: Framework for Knowledge Based Collaborative Environments in Internet", In Proceedings of the Advanced International Conference on Telecommunications and International Conference on Internet and Web Applications and Services, Feb. 19, 2006, 6 Pages.
Kim, et al., "On Intelligent Avatar Communication Using Korean, Chinese and Japanese Sign-Languages: An Overview", In Proceedings of 8th Control, Automation, Robotics and Vision Conference, Dec. 6, 2004, pp. 747-752.
Lima, et al., "LIBRAS Translator via Web for Mobile Devices", In Proceedings of the 6th Euro American Conference on Telematics and Information Systems, May 23, 2012, pp. 1-4.
Loutas, et al., "Browsing Service Registries using the Atom interface: An Application in a-Government", In Proceedings of the Third International Conference on Digital Information Management, Nov. 13, 2008, pp. 782-787.

(56) References Cited

OTHER PUBLICATIONS

"International Search Report & Written Opinion Issued in PCT Application No. PCT/US2015/065265", dated Mar. 4, 2016, 10 Pages.

"International Preliminary Report on Patentability Issued in PCT Application No. PCT/US2016/054251", dated Dec. 21, 2017, 18 Pages.

"International Search Report and Written Opinion issued in PCT Application No. PCT/US2016/054251", dated Dec. 22, 2016, 16 Pages.

"Second Written Opinion Issued in PCT Application No. PCT/US2016/054251", dated Jul. 20, 2017, 9 Pages.

Sun, et al., "Providing Context-Awareness in the Smart Car Environment", In IEEE 10th International Conference on Computer and Information Technology, Jun. 2010, pp. 13-19.

"Non Final Office Action Issued in U.S. Appl. No. 16/016,654", dated Nov. 5, 2018, 8 Pages.

Gamble, et al., "Fact: A Fusion Architecture With Contract Templates for Semantic and Syntactic Integration", In Proceedings of IEEE International Conference on Information Reuse and Integration, Jul. 13, 2008, pp. 380-385.

Konstantinou, et al., "Priamos: A Middleware Architecture for Real-Time Semantic Annotation of Context Features", In Proceedings of 3rd International Conference on Intelligent Environments, Sep. 24, 2007, 8 Pages.

Pastore, et al., "Introducing Semantic Technologies in Web Services-Based Application Discovery Within Grid Environments", In Proceedings of Fourth European Conference on Universal Multiservice Networks (ECUMN'07). Feb. 14, 2007, 10 Pages.

Willmott, et al., "Adapting Agent Communication Languages for Semantic Web Service Inter-Communication", In Proceedings of IEEE/WIC/ACM International Conference on Web Intelligence, Sep. 19, 2005, 4 Pages.

"Final Office Action Issued In U.S. Appl. No. 15/279,240", dated Feb. 25, 2019, 17 Pages.

"Office Action Issued In European Patent Application No. 16778979.1", dated Mar. 29, 2019, 9 Pages.

* cited by examiner

UNIFIED VIRTUAL REALITY PLATFORM

CROSS-REFERENCE TO RELATED APPLICATIONS

This application claims the benefit of, and incorporates by reference, in its entirety, U.S. Provisional Patent Application No. 62/233,601, filed Sep. 28, 2015.

This application further incorporates by reference, in its entirety, U.S. Pat. No. 9,111,214, "Virtual Assistant System to Remotely Control External Services and Selectively Share Control," to Sharma et al., issued Aug. 18, 2015.

BACKGROUND

In a virtual reality (VR) system, a user interacts with a digitally simulated virtual environment designed to emulate characteristics of the real world. In particular, the VR system may include sensors to detect input from the user, e.g., movements, voice, eye gaze, etc., and also generate output for the user, e.g., stereoscopic imagery, audio, tactile feedback, etc., to create the sensation that the user is "present" in and interacting with the virtual environment.

VR systems may be utilized for a wide variety of applications, including providing users with entertainment and/or informative content. VR systems may also serve as an interface between human users and non-VR systems, such as shopping or social networking applications. For example, a gesture made by a user of a VR system may be interpreted as a command to perform a task in a non-VR system, such as adding a friend on a social network, performing a search on a submitted query, making purchases on a shopping website, etc. To facilitate the interaction of VR system modules and non-VR system modules, it would be desirable to provide a flexible unified computational platform supporting VR and non-VR module types.

Another key feature of state-of-the-art VR systems will be their ability to provide both breadth and depth of detail for each virtual environment. For example, an integrated VR system may provide a diverse variety of virtual experiences, e.g., simulating the details of walking down a busy street, entering the interior of a virtual store with diverse offerings for purchase, driving a virtual car, etc. As each virtual experience is expected to fully immerse the user in the simulated environment, the unified computational platform will also need to flexibly accommodate the complex details of diverse VR experiences, as well as manage the transitions between VR experiences for the user.

Yet another feature of advanced VR systems will be their ability to allow interactions between multiple users in "joint" VR environments. For example, multiple users will have the capability to perceive each other's presence and actions in a single joint environment, thus allowing for collaboration amongst the users on joint tasks.

To meet the aforementioned requirements, it would be desirable to provide flexible and versatile techniques for designing a unified computational platform for use in advanced virtual reality systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for providing a unified computational platform for implementing virtual reality systems. In an aspect, a VR client includes input and output modules for generating the VR experience for a user, and also an assistant interface that couples the input and output modules to an assistant server. The assistant interface may encapsulate user inputs into a message according to a predefined semantic information interchange language (SIIL) specification.

The assistant server may include a command inference block for converting user-input SIIL messages to command-input SIIL messages. This conversion encodes user inputs to the VR system into a general command set that may be recognized and processed by both VR and non-VR modules. The assistant server may further include hardware for implementing a plurality of software plugins, each plugin dedicated to an individual VR or non-VR module, and designed to translate command-input SIIL messages into a custom or proprietary protocol used by each module. The present techniques considerably simplify and modularize the design of modules in a VR system, and reduce the burden on such modules to build or store their own mappings between user inputs and executed commands.

Other advantages may become apparent from the following detailed description and drawings.

DETAILED DESCRIPTION

Figure 1:
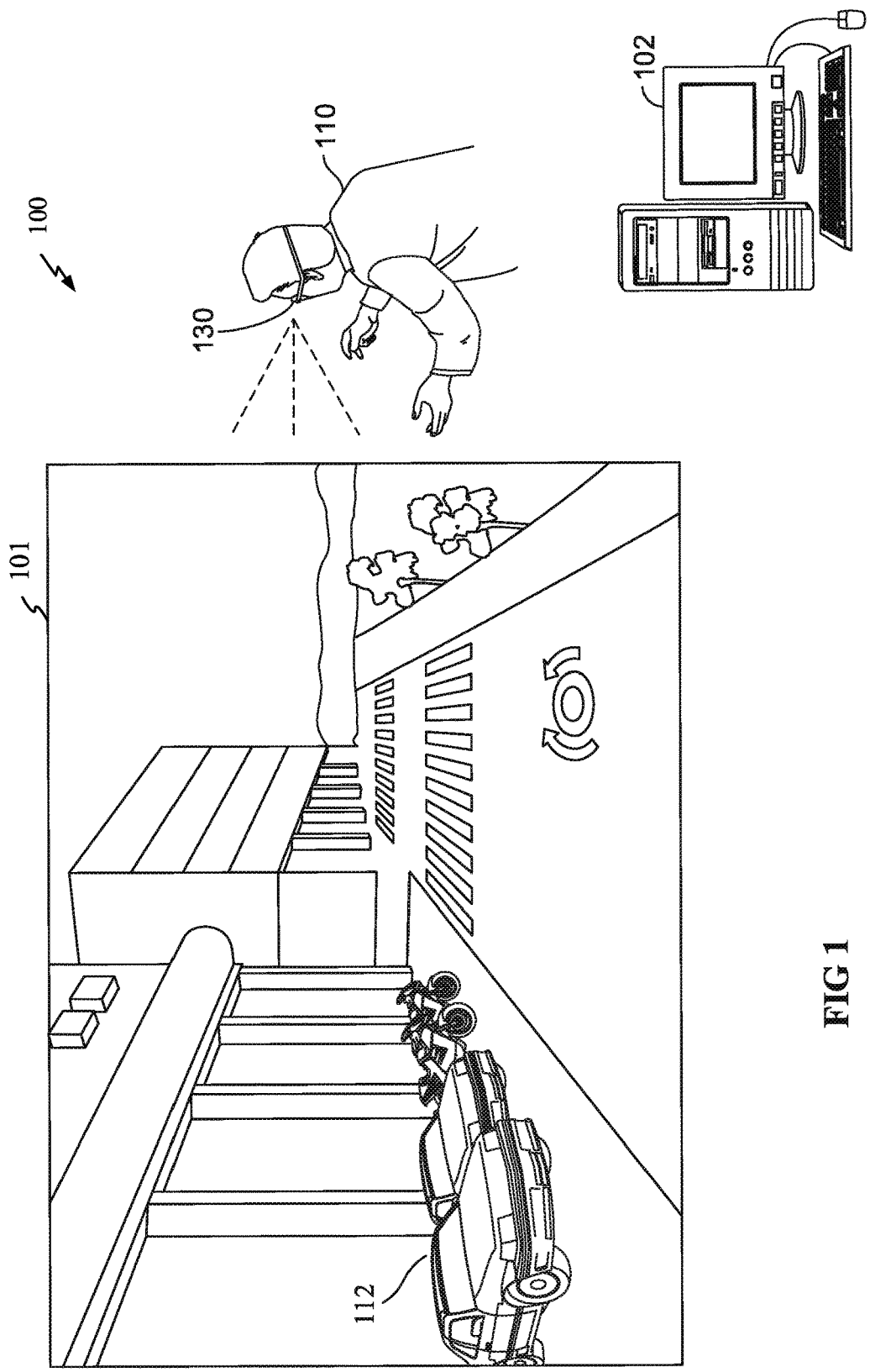
FIG. 1 illustrates a virtual reality street scenario according to the present disclosure.

Various aspects of the technology described herein are generally directed towards techniques for generating a virtual reality platform system facilitating the interaction of multiple distinct modules in a single VR experience. It will be appreciated that certain features of the techniques described below may be used for any systems for interaction between a user device and external services or modules, and such alternative exemplary embodiments are contemplated to be within the scope of the present disclosure.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein. For ease of discussion, reference may be made hereinbelow to numerical elements without the corresponding "0.1" or "0.2" suffix shown in the figures, in which case it will be understood that such reference is meant to denote any or all corresponding elements having a "0.1" or "0.2" suffix in the figures, as will be clear from the context.

In virtual reality (VR) systems, users may be immersed in and interact with a digitally simulated virtual environment. For example, referring to FIG. 1, VR scenario 100 includes one or more computers 102 or mobile devices, VR headset 130 worn by user 110, and one or more sensors (not shown) for detecting VR input from user 110, e.g., in the form of movement, voice, gestures, etc. VR output may be presented to user 110, e.g., VR headset 130 may present a three-dimensional (3D) stereoscopic view of a virtually simulated VR environment 101 to user 110, audio may be generated corresponding to VR environment 101 using audio output equipment (e.g., headphones or speakers) not shown in FIG. 1, or other output modalities may be included such as temperature, tactile response, etc.

User 110 may interact with VR environment 101 using any of a plurality of input modalities, e.g., spoken commands, hand gestures, virtual "touch" of icons displayed in the environment, other types of body orientation and/or movement signals, etc. The VR system may accordingly adjust the presentation of VR environment 101 to user 110 using the visual and/or other VR output modalities. Note the particular details of the VR system of FIG. 1 are described herein for illustrative purposes only, and are not meant to limit the scope of the present disclosure to any embodiments specifically mentioned, e.g., types of input or output modalities, types of VR environment or applications, etc.

In an exemplary embodiment, VR headset 130 and other input/output sensors of the VR system may be in communication with computer 102, which in turn is in communication with a network supporting the assistant server(s) further described hereinbelow. In an alternative exemplary embodiment, VR headset 130 may directly be in communication with such a network. Such alternative exemplary embodiments are contemplated to be within the scope of the present disclosure.

In FIG. 1, VR environment 101 is illustratively shown to be a VR simulation of a street-level environment (hereinafter denoted "VR street 101"), although it will be appreciated that any type of VR environment may be accommodated using techniques of the present disclosure. In VR street 101, user 110 may be immersed in a VR environment in which he or she experiences the sensation of standing and moving outdoors on a street lined with many venues and other objects. In VR street 101, user 110 may have the option of approaching and interacting with various venues and objects in the simulation. For example, by walking towards virtual automobile 112, and performing a gesture such as touching the handle of the automobile door using a specific hand gesture, the VR system may infer an intent by user 110 to enter the interior of the automobile and virtually drive the automobile.

Figure 2:
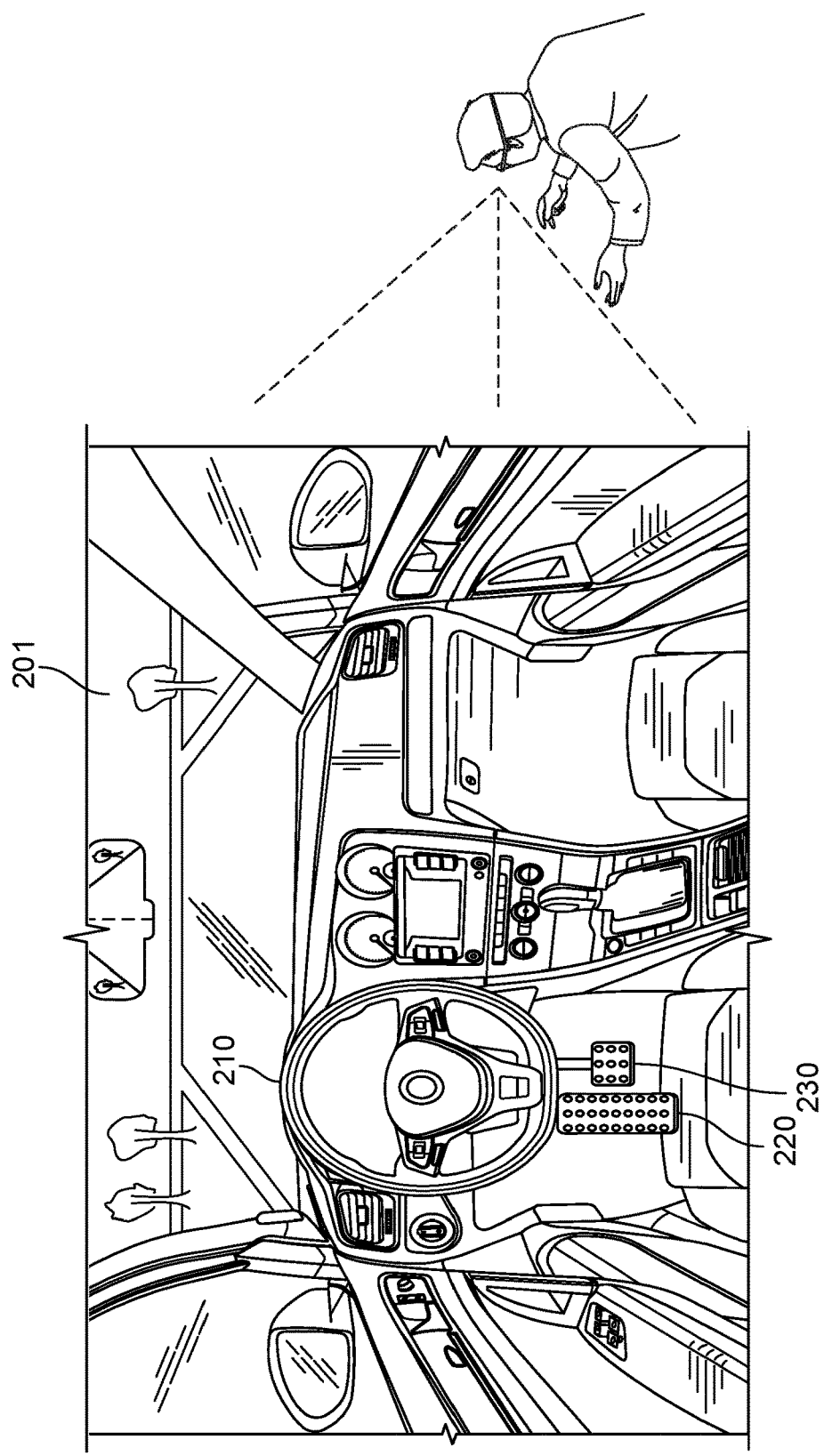
FIG. 2 illustrates a virtual reality drive scenario according to the present disclosure.

In response to detecting such a gesture or other type of VR input signal, the VR system may accordingly cause VR environment 101 to transition to a second VR environment, such as VR environment 201 shown in FIG. 2. In FIG. 2, VR environment 201 is illustratively shown as corresponding to a virtual driving simulation (hereinafter denoted "VR drive"), and is illustrated from the simulated perspective of the driver's side of the interior of a car. In VR drive 201, user 110 may virtually experience driving the car, e.g., by turning a virtual steering wheel 210 whose movements are monitored by the VR system, stepping on virtual gas pedal 220 and brake pedals 230, etc., all of which may correspond to mechanical input sensors physically engaged by user 110. The VR system may continually monitor the states of such mechanical input sensors, and may accordingly adjust the generated VR environment 201 in response to the inputs received.

Figure 3:
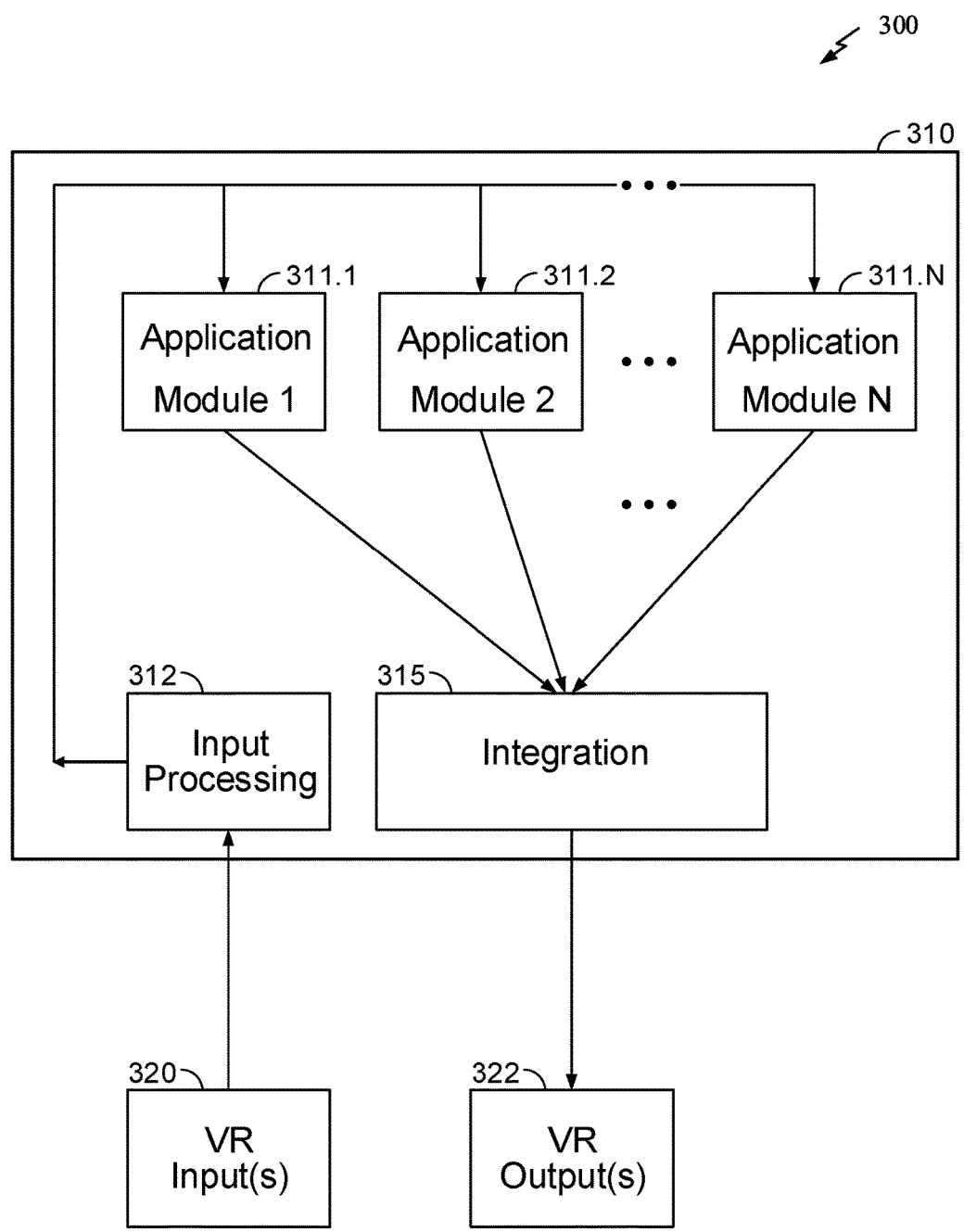
FIG. 3 shows a particular implementation of a VR system.

In view of the description hereinabove, it will be appreciated that a single VR system may be called upon to accommodate multiple, diverse types of virtual experiences and environments, e.g., VR environment 101 and VR environment 201, as well as to interface with non-VR applications. FIG. 3 shows a particular implementation 300 of a VR system designed to accommodate these requirements. Note FIG. 3 is shown for illustrative purposes only, and is not meant to limit the scope of the present disclosure to any particular implementations of a VR system.

In FIG. 3, VR system 300 includes input module 320 for receiving inputs from user 110. Such input may include, e.g., voice input, gestures, keyboard, etc. VR system 300 further includes output module 322 for generating sensory outputs for the user VR environment. Such output may include, e.g., 3-D visual imagery as delivered through VR headset 130, sounds, tactile output, ambient temperature control, etc. In this Specification and in the Claims, inputs received by input module 320 may be denoted "user input" or "VR input," and outputs generated by output module 322 may be denoted "VR output." VR system 300 further includes VR processing block 310 for processing the received VR input signals and generating VR output signals.

In particular, input signals from VR inputs 320 may be provided to input processing block 312, which selectively provides the signals to a plurality of application modules 311.1 through 311.N, collectively denoted application modules 311. Application modules may include one or more "VR modules" designed to perform processing specific to a VR experience. For example, a VR module may be configured to generate VR street 101, and process inputs and outputs related to such a VR environment. Application modules may also include one or more "non-VR modules" that do not specifically process VR experiences for users. Examples of non-VR modules may include, but are not limited to, e.g., social networking applications, shopping websites, information databases, etc.

Following processing by application modules 311, each application module may generate an output signal for an integration block 315. Integration block 315 may be configured to integrate the output signals from application modules 311 into a single, seamless VR experience for the user. The output of block 315 is then provided to output module 322.

As virtual environments become ever more sophisticated, the details for implementing the overall VR system become increasingly complex. For example, non-VR modules are often pre-existing proprietary applications that are not modifiable by designers of VR system 300. As such, non-VR modules may specify their own proprietary or custom protocols for communication with the applications, which designers of VR system 300 must account for.

Furthermore, for VR modules, the task of providing a fully immersive experience require VR environments to incorporate ever more detail and complexity. For example, a VR module implementing VR drive 201 may be configured to accommodate increasingly sophisticated algorithms to realistically simulate the experience of driving a car, e.g., providing more realistic and diverse driving scenarios, automobile response, automobile controls, etc. At the same time, a VR module implementing VR street 101 may be configured to accommodate ever more street layouts, including shopping, entertainment, and guide options, etc.

In view of the complexity of the individual VR experiences, it will be appreciated that there are certain limitations to designing VR system 300 to accommodate such complexity. In particular, it is challenging to design VR system 300 to accommodate transitions between a plurality of virtual experiences, due to the sheer quantity of details that need to be coordinated. Furthermore, in high-performance VR systems, it would be desirable to provide a unified environment as the background for all VR environments, such that transitions amongst different VR environments appear "seamless" from the perspective of user 110.

For example, it would be desirable to integrate the transitions between separate VR experiences, such that, e.g., when user 110 approaches car 112 in VR street 101 and opens the door to car 112 to virtually enter the driver's seat, the environment displayed through VR headset 130 would continuously transition from VR street 101 to VR drive 201, as would occur in the corresponding real-world experience. It would be undesirable to introduce, e.g., sudden black-outs in the imagery displayed by VR headset 130, corresponding to the transition interval caused by loading separate software systems for VR environment 101 versus for VR environment 201, which might unduly disorient the user.

As another example, if the user desires to perform a VR gesture (e.g., a hand wave or voice command etc.) to control certain non-VR applications, it is desirable to coordinate the integration of the VR experience with the non-VR application to provide the impression of a single, unified VR environment.

It may readily exceed the capabilities of a single entity, such as a single software design team or organization, to design a single VR system 310 to accommodate all types of VR as well as non-VR experiences, and to provide for seamless transitions between such experiences as would need to be performed by transition block 315 described with reference to VR system 300. Accordingly, it would be desirable to provide a new flexible computational architecture for VR systems that accommodates the complexity and diversity of individual application modules, while also facilitating their integration to ensure seamless transitions for users when navigating within the VR environment.

It would further be desirable to maintain a single background control panel and framework within the VR environment, such that, e.g., a particular user hand gesture would bring forth a "home menu" or other general functionality, regardless of the particular VR experience the user is engaged in at the moment.

It would further be desirable to provide techniques for flexibly integrating VR modules with non-VR modules, e.g., to allow VR inputs to be understood and processed as commands by non-VR applications.

Figure 4:
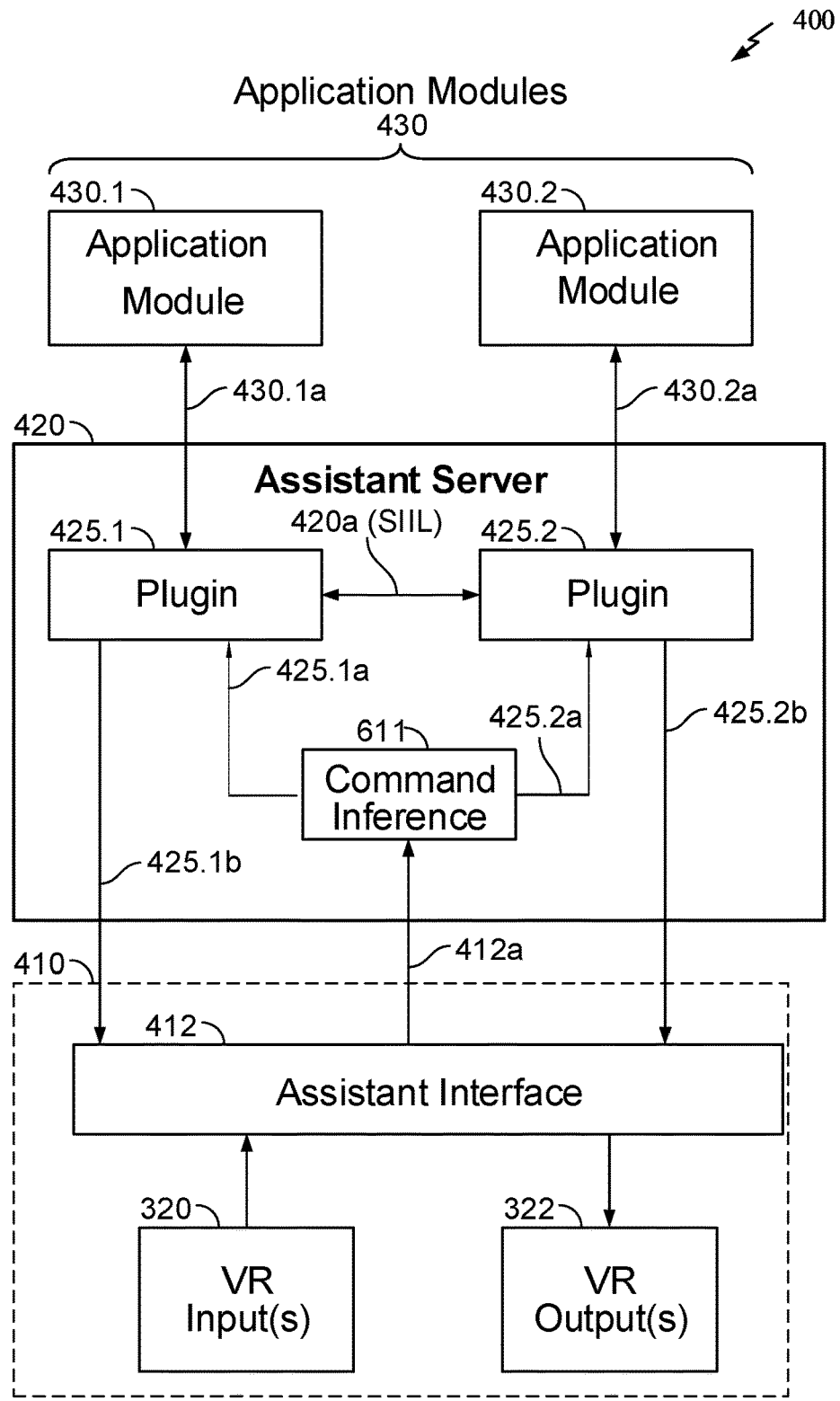
FIG. 4 illustrates an exemplary embodiment of a VR system according to the present disclosure.

FIG. 4 illustrates an exemplary embodiment of a VR system 400 according to the present disclosure. Note FIG. 4 is shown for illustrative purposes only, and is not meant to limit the scope of the present disclosure. For example, while two application modules 430.1, 430.2 are illustratively shown in FIG. 4 for illustrative purposes, it will be appreciated that the techniques described herein may readily accommodate more than two application modules.

In FIG. 4, similar to VR system 300 in FIG. 3, VR system 400 includes input module 320 for receiving VR inputs from user 110, and output module 322 for generating sensory outputs for the VR environment. VR system 400 further includes an assistant interface 412 configured to process the VR inputs and VR outputs. Assistant interface 412, input module 320, and output module 322 will also be collectively referred to herein as client 410. Note client 410 may generally be provided locally to the user, e.g., input module 320 and output module 322 may correspond to elements such as headset 130 and computer 102 in FIG. 1, as well as to other elements not explicitly shown, while assistant interface 412 may also be implemented on computer 102. Other arrangements of the elements shown will be clear to one of ordinary skill in the art in view of the present disclosure.

Assistant interface 412 of client 410 may provide a "translation functionality" to translate proprietary or "custom" data and information into a single universal language known as "semantic information interchange language" or "SIIL" for communication with the diverse application modules coupled to the VR environment. In particular, assistant interface 412 may receive VR input signals from input module 320, and translate such input signals into one or more messages formatted according to the format specified by SIIL. The SIIL format may be defined by an openly available Specification, and may contain various standardized message formats. In this Specification and in the Claims, SIIL may also be denoted as a "first protocol."

For example, a VR input signal received at assistant interface 412 from input module 320 may include parameters of a user hand gesture, e.g., as detected by motion-detecting cameras and/or gyroscopes, or parameters corresponding to a user voice command processed by voice recognition software, etc. Assistant interface 412 may encode or format the received parameters into standard SIIL messages, e.g., SIIL messages indicating user input or "user-input SIIL messages."

As an illustrative example, a first user-input SIIL message format may correspond solely to hand gestures, and may specify identifying features of hand gestures such as typical motions (e.g., "swipe," "circle," "repeat swipe," etc.), hand-finger configurations (e.g., "index finger," "thumb," etc.), etc. A second user-input SIIL message format may correspond to voice-recognized text, and may specify identifying features such as the content of the recognized text, speed of speech delivery, characteristics of the speaker's voice, etc. Note particular types of SIIL message formats are described herein for illustrative purposes only, and are not meant to limit the scope of the present disclosure.

In an exemplary embodiment, assistant interface 412 may provide the generated SIIL messages, e.g., user-input SIIL messages, to an assistant server 420 over communications channel 412*a*. Note the various instances of "channels" mentioned herein may generally denote physical and/or logical channels, and/or combinations of both. Assistant server 420 is a server that may include a computer, a dedicated computer (i.e., a back-end server), or a plurality of computers, running one or more applications (i.e., software) that allows communication with assistant interface 412 via the Internet or other communications channel, and also allows communication with a potentially infinite range of application modules 430.

In particular, assistant interface 412 may provide the generated user-input SIIL messages to command inference block 611 of assistant server 420. Block 611 may effectively infer the intent behind the user's input as specified in the user-input SIIL messages. Block 611 converts user-input SIIL messages into "command-input" SIIL messages, as will be further described hereinbelow with reference to FIG. 6. Command-input SIIL messages 425.1*a* destined for application module 430.1 and command-input SIIL messages 425.2*a* destined for application module 430.2 are provided to module-specific plugins 425.1, 425.2, collectively denoted plugins 425 herein.

To facilitate the design of an interface between client 410 and application modules 430, assistant server 420 may support an open type platform, e.g., a software platform whereby any software engineer (also referred to as the software developer) may create software connectors or plugins 425 to interface with any of the application modules. In particular, each of plugins 425 may be configured to perform translation from command-input SIIL messages into messages of the corresponding application module's proprietary protocol, and vice versa. Thus each of plugins 425 handles translation between SIIL used by assistant server 420 and the proprietary protocol used by a respective one of the application modules.

For example, in an exemplary embodiment wherein module 430.1 is a VR module for implementing VR street 101, a software developer of such a VR module may specify a proprietary messaging format, according to which inputs and outputs to the VR module are expected to be specified. Similarly, in an exemplary embodiment wherein module 430.2 is a non-VR module for implementing a social networking application, a software developer of the social networking application may specify a proprietary messaging format in which tasks of the application may be conducted, e.g., adding friends, updating or checking status, etc.

It will be appreciated that developers or engineers of the application modules, or any other parties, may create plugins 425 at the assistant server 420 to allow assistant server 420 to communicate with a respective application using the application module's specific proprietary protocol. Plugin 425 may be created based on knowledge of both SIIL and the proprietary protocol for each application module.

Application modules 430 may generate output data destined for client 410, which may first be communicated to respective plugins 425 using the proprietary protocol for each application module. In this case, plugins 425 may encapsulate such output data using SIIL messages, and transmit the SIIL messages to assistant interface 412 over channels 425.1*b*, 425.2*b*. Upon receiving such output data, assistant interface 412 provides the data to VR outputs provided by output module 322 to accordingly generate a VR output experience for the user.

In an exemplary embodiment, assistant server 420 and plugins 425 may be included together in a single hardware installation, or in multiple hardware installations. Communications 430.1*a*, 430.2*a* between VR modules and their respective plugins may be conducted via the Internet, WiFi, Bluetooth, WiFi direct, HDMI, USB, FireWire, NFC or other means. In alternative exemplary embodiments, plugins 425 may be directly incorporated into the corresponding application modules 430 themselves. For example, application module 430.1 may be implemented on one or more computer servers, along with its dedicated plugin 425.1. Such alternative exemplary embodiments are contemplated to be within the scope of the present disclosure.

Figure 5:
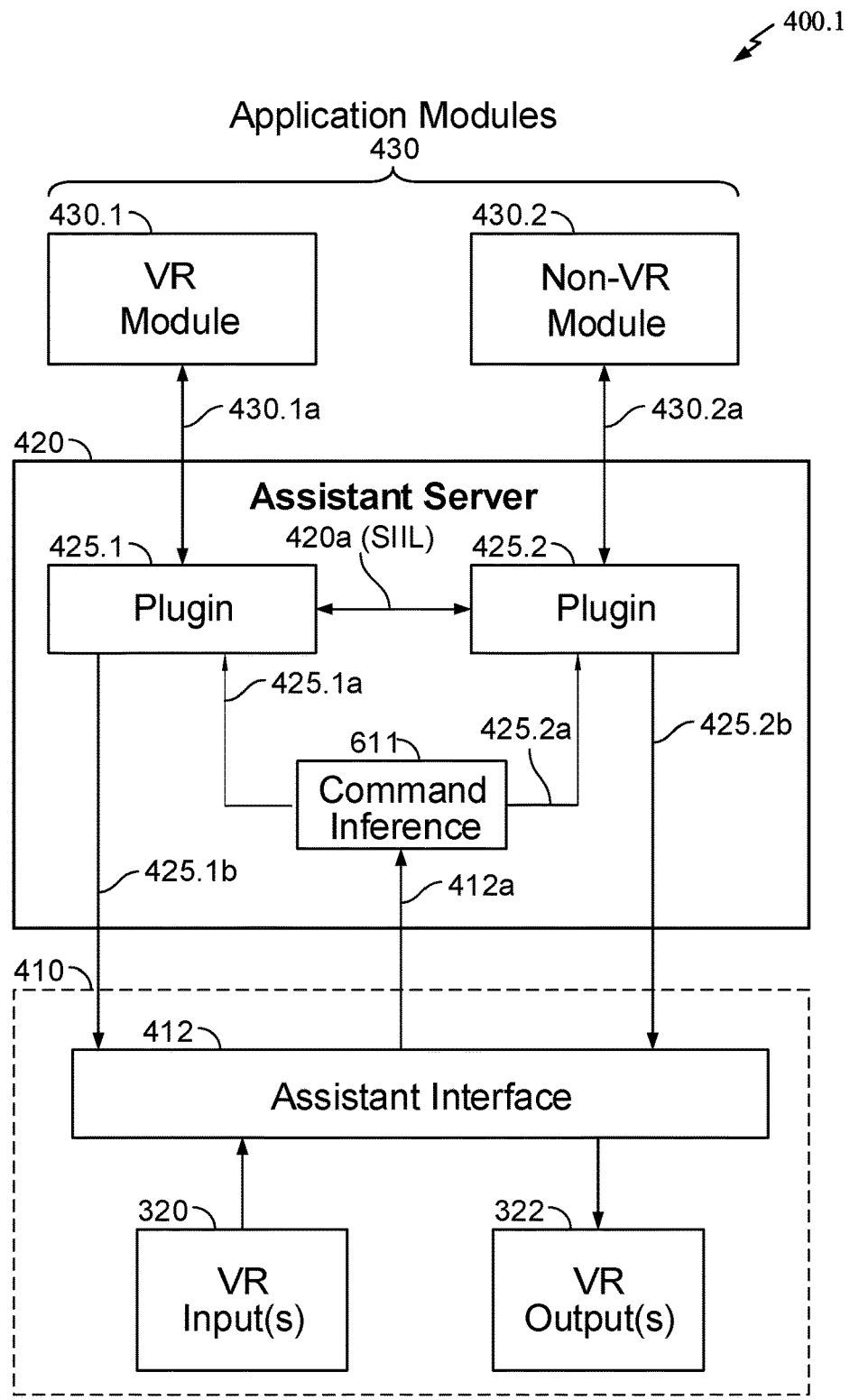
FIG. 5 illustrates an exemplary embodiment of the VR system of FIG. 4, showing a VR module and a non-VR module.

FIG. 5 illustrates an exemplary embodiment 400.1 of VR system 400, wherein application module 430.1 is a VR module, and application 430.2 is a non-VR module. Note FIG. 5 is shown for illustrative purposes only, and is not meant to limit the scope of the present disclosure.

In an exemplary embodiment, VR system 400.1 may support a VR environment that functions as a VR interface to a non-VR service. For example, VR module 430.1 may generate a VR environment such as VR street 101. Through its dedicated plugin 425.1, VR module 430.1 may receive user input related to a selection of a product that is displayed in VR street 101, e.g., a dress displayed in a virtual storefront featured in VR street 101. Once a user selects the dress, e.g., by using appropriate VR input gestures such as pointing at the dress in the virtual storefront, or using voice control, etc., assistant interface 412 may generate the corresponding user-input SIIL messages. Command inference block 611 may then convert the user-input SIIL message into command-input SIIL messages, and the command-input SIIL messages may be transmitted to plugin 425.2 for non-VR module 430.2.

In an exemplary embodiment, non-VR module 430.2 may be a shopping application, which may process the selection of a specific dress by the user in the VR environment as a request to purchase the dress. Further details of the transaction (e.g., details of the dress selected, payment method of the user, etc.) may be obtained by the non-VR plugin 425.3, e.g., via SIIL messages from plugin 425.1 using channel 420*a*, or directly requested from the user via plugin 425.2.

In an alternative exemplary embodiment, a VR user may interact with a VR module and transfer data across multiple non-VR application modules using SIIL messages. For example, VR module 430.1 may generate a VR storefront experience for the user, wherein the user may select items for purchase from a virtual storefront displaying multiple such items. Through plugin 425.1, VR module 430.1 may receive user input related to a selection of a product that is displayed in VR storefront, e.g., a dress displayed in a virtual storefront. The user may desire to obtain further information about the product, and accordingly "send" the product to a (non-VR) database service that provides further information about such products.

To perform this task, the user may provide a VR input, such as a hand gesture whereby the article of virtual clothing is picked up and "tossed" to an icon in the VR environment corresponding to the database service. This VR input may generate, e.g., a command-input SIIL message sent to the non-VR plugin (not shown in FIG. 5) corresponding to the database service's application module (not shown in FIG. 5). The user may further provide additional VR inputs to command the database service to find and preview similar items on another non-VR shopping platform application and its corresponding non-VR plugin.

Figure 6:
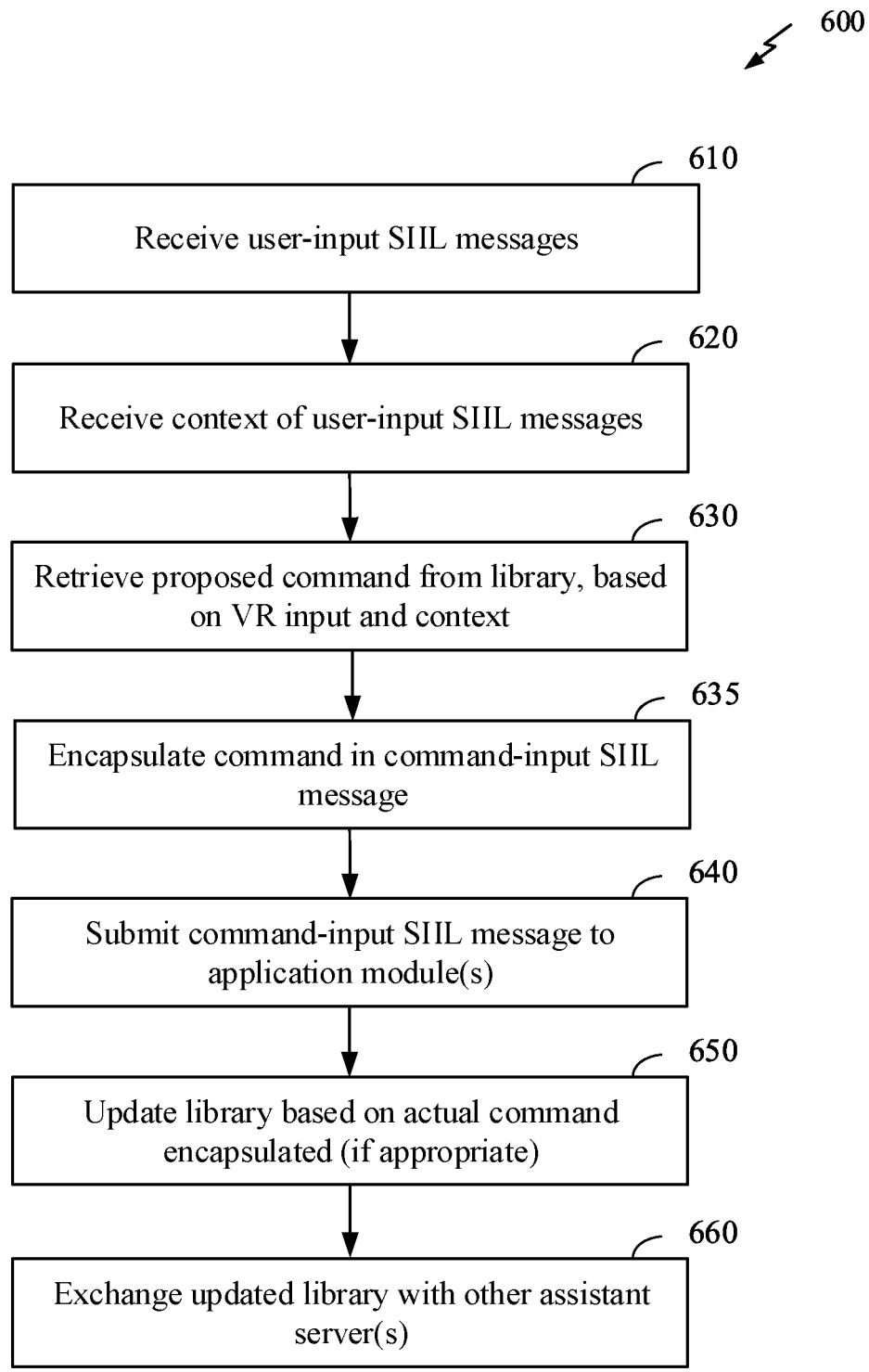
FIG. 6 illustrates an exemplary embodiment of operations performed by the command inference block.

As discussed hereinabove, command inference block 611 is configured to convert user-input SIIL messages into command-input SIIL messages. For example, the aforementioned VR input of a hand gesture "tossing" an item to an icon in the VR environment needs to be converted to a command to send the item to a database service to retrieve further information, i.e., the meaning of the toss needs to be inferred by the system. FIG. 6 illustrates an exemplary embodiment 600 of operations performed by command inference block 611. Note FIG. 6 is shown for illustrative purposes only, and is not meant to limit the scope of the present disclosure to any particular implementation of command inference block 611. Note the exemplary embodiment 600 of operations may be performed by any instance of command inference block 611 described in this Specification, including, e.g., in VR systems 400, 400.1, 400.2, 1000, etc.

In FIG. 6, at block 610, command inference block 611 receives user-input SIIL messages from the corresponding user(s). In an exemplary embodiment, user-input SIIL messages may be received from a client for a single user, e.g., via VR inputs from input module 320 coupled to assistant interface 412 in communication with assistant server 420. In an alternative exemplary embodiment, user-input SIIL messages may also be received from other user(s), e.g., via a communication channel 1020a shown in FIG. 10 from a command inference block 611 of another assistant server 420, e.g., resident on another sub-system. In this manner, any assistant server 420 may recognize "multi-user" commands that are composed of inputs from multiple users.

At block 620, the context of the user-input SIIL messages received at block 610 is also received. In particular, the meaning of user inputs may vary depending on the context in which they are received. In this Specification and in the Claims, "context" may refer to the specific user or overall system configuration or situation that forms the background from which a particular user input arises. For example, context may denote the co-presence of other individuals in a joint VR environment when one user generates an input, the user's geographic location when generating the input, a time of day when the user input is made, a direction in which a physical input such as a gesture is made, any user's previous input history, or any other details accompanying a particular user input, etc.

For example, if a gesture user input is made in the direction of a light, command inference block 611 may interpret the gesture as, e.g., a command to reduce the brightness level. If the same gesture is made in the direction of a music player, block 611 may interpret the gesture as, e.g., a command to reduce a volume level.

The same inputs may also be interpreted differently for different users. For example, if one user consistently uses a gesture to execute a first command and another person uses the same gesture to execute a second command, block 611 may learn to identify these preferences based on taking the user identity as the context. Note that this use of adaptive learning to interpret user inputs differently for different users also permits the emergence of "dialects" of input-command inference in different user groups, or between individuals.

At block 630, based on the user-input SIIL messages received at block 610 and context received at block 620, command inference block 611 retrieves a proposed command from a stored library of input/context-to-command mappings. In particular, block 611 may have access to a memory (not shown) in assistant server 420 which stores candidate commands corresponding to distinct combinations of user inputs and context.

For example, a specific user-input SIIL message may include a "counterclockwise circle" hand gesture, and a context of that user listening to a music player while using the VR system. In an exemplary embodiment, this combination of user input and context may be mapped by block 611, using the stored library, into a proposed command of "increasing the volume" of the music player. Note this mapping is described for illustrative purposes only, and is not meant to limit the scope of the present disclosure to any particular mappings between input/context and commands.

At block 635, a command is encapsulated as a command-input SIIL message. In an exemplary embodiment, the proposed command retrieved at block 630 may correspond to the actual command encapsulated at block 635. In an alternative exemplary embodiment, the proposed command retrieved at block 630 need not be the actual command encapsulated at block 635. In particular, various techniques may be employed to refine the proposed command based on other factors, e.g., corrections as applied by the user, or by other users, etc.

In particular, when a user generates a VR input that is not recognized or is incorrectly interpreted by block 611, the user can reject the proposed command, and instead explicitly enter commands to be executed through a graphical interface, e.g., a display of selectable icons. In this manner, the difference between proposed and executed commands can be incorporated to enable block 611 to adapt and learn the appropriate commands to associate with the unrecognized or misinterpreted VR inputs.

Furthermore, in a joint VR experience shared amongst two or more users, e.g., as further described hereinbelow with reference to FIGS. 9-11, one user may make a user input that can then be corrected or complemented by another user. For example, one user might make a counterclockwise circle hand gesture to change from a first VR environment to a second VR environment. The VR system may fail to recognize this hand gesture, e.g., if the correct gesture to perform the change in environment is actually an open-then-close first gesture, as determined from the stored library of stored user inputs accessible by the assistant server. In this case, a second user might note the incorrect gesture by the first user, and could be enabled to perform the desired task on behalf of the first user by signaling the correct gesture (i.e., the correct gesture as determined by the currently stored library contents). Thus in this case, an additional user refines the proposed command into an actual command.

At block 640, the command-input SIIL message encapsulating the proposed command is submitted to one or more application modules. For example, in the exemplary scenario described hereinabove wherein a counterclockwise circle gesture is mapped to an "increase volume" command for a music player, assistant server 420 may submit a command-input SIIL message encapsulating the command "increase volume" to a non-VR module implementing a music player. Thus, in this instance, the non-VR module implementing the music player need not have knowledge of the particular user input (e.g., counter-clockwise circle hand gesture) or user-input SIIL message from which the command-input SIIL message was derived. It will thus be appreciated that the present techniques considerably simplify and modularize the design of modules, both VR and non-VR, by providing a generalized SIIL interface specifying the commands, thus freeing up the modules from the requirement to build or store their own mappings between user input and commands.

At block 650, if appropriate, a library accessed by command inference block 611 may be updated based on the actual command encapsulated at block 635. In particular, referring to the scenario described hereinabove, wherein a second user performs a task on behalf of the first user by signaling the correct gesture, command inference block 611 in communication with the first user may then update its library to associate the original, non-recognized input of the counter-clockwise circle hand gesture with the intended command of changing VR environments. This updating of the library is an example of adaptive learning, which enables the assistant server to adaptively expand its vocabulary of user inputs. This adaptive learning might be fully automated or involve human guidance and curation. The automated component of the learning can employ various machine learning, deep learning or other techniques.

At block 660, updates to the library at block 650 may be exchanged with other assistant server(s). In particular, the updating of the library by an assistant server can be extended to other instances of the assistant server, e.g., corresponding to other sub-systems. Different instances of the assistant server may thus communicate to each other the adaptively learned mappings between user inputs and command inputs to update their respective libraries.

Figure 10:
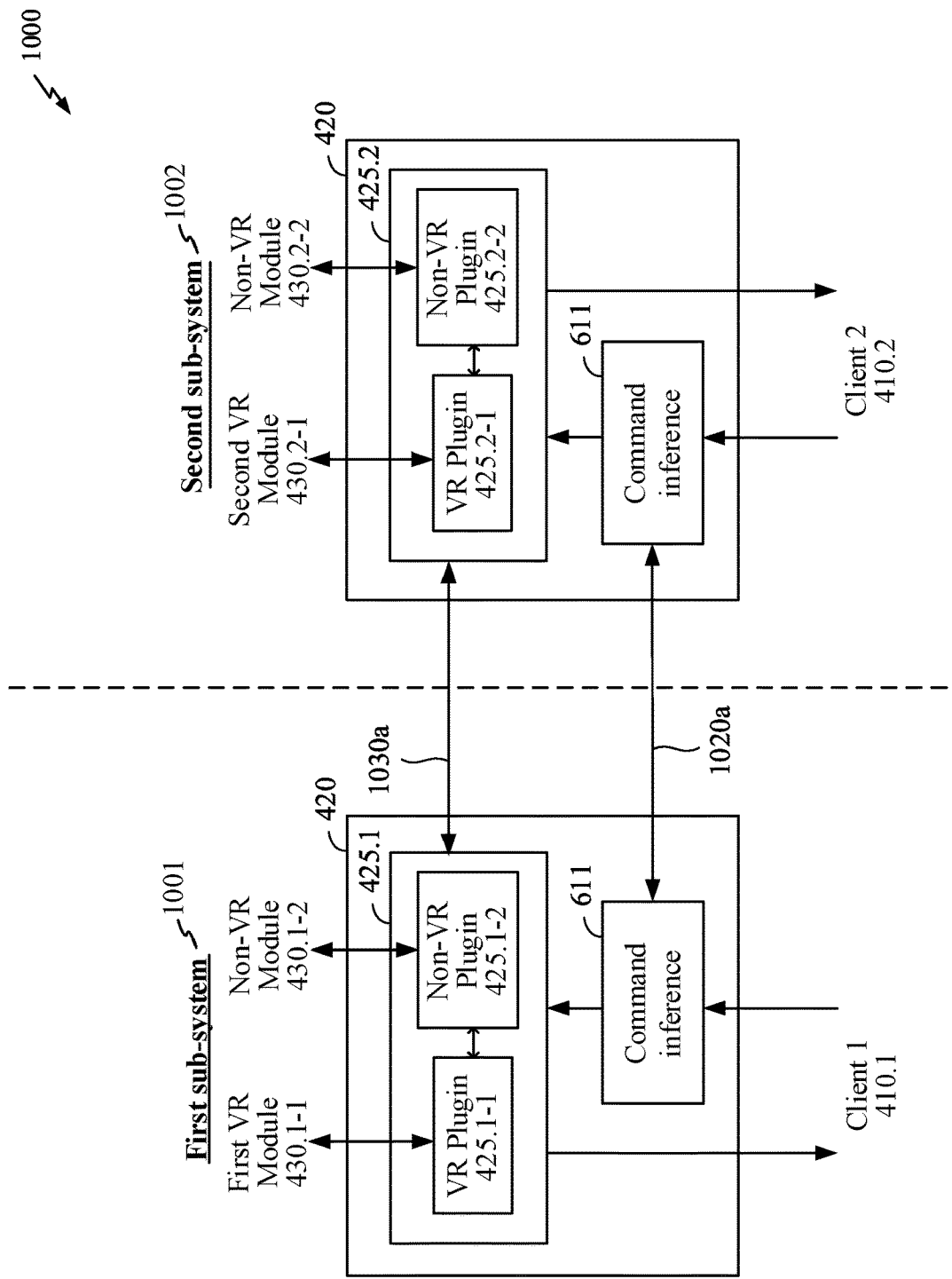
FIG. 10 illustrates an exemplary embodiment of a joint VR system according to the present disclosure.

In an exemplary embodiment, at blocks 610-630, multiple VR inputs from one or more users can be bundled together to generate a single set of commands, e.g., using channel 1020$a$ amongst multiple users, as illustrated in FIG. 10 discussed hereinbelow. For instance, if a set of commands is repeatedly executed as the result of a corresponding set of VR inputs (e.g., hand gesture A followed by voice command B followed by hand gesture C) generated by a user, command inference block 611 may automatically bundle the set of VR inputs into a single composite VR input (e.g., hand gesture A), the execution of which will trigger the set of commands to be performed.

In an alternative exemplary embodiment, "multi-user" VR inputs executed by multiple users may similarly be bundled into a single composite VR input to trigger the entire set of commands. For example, if some VR input is generated by User A, then followed by a VR input by User B, and then another VR input by User C, and these users often perform these actions in conjunction, then all of these VR inputs can be bundled together into a single composite VR input to trigger the sequence of commands that would otherwise be executed if each VR input was separately performed by each user.

In an exemplary embodiment, equivalences may be established between handheld experiences (e.g. with a smartphone, as described in U.S. Pat. No. 9,111,214) and VR experiences for specific user inputs. So, in the library of user inputs, some user inputs may be marked (e.g., by the received context at block 620) for use in handheld experiences, some user inputs may be marked for VR experiences, and some user inputs may be marked for both handheld and VR experiences. In some cases, there will be a mapping where a specific mobile user input (for example, an icon touch) corresponds to a different user input (for example, a gesture). These mappings can be inferred by the virtual assistant system based on usage and feedback patterns, via adaptive learning. The mappings may also be explicitly provided by plugin developers.

As described hereinabove, by standardizing communications between VR and non-VR modules and assistant server(s) using SIIL, and providing inference functionality (e.g., at block 611) at the assistant server(s), plugin developers may define one or more given actions for a plugin in the semantic information interchange format language, without defining a priori which specific VR inputs should cause these one or more actions to be performed. In an exemplary embodiment, plugin developers may, at a later time, define VR module-specific mappings between VR inputs and commands. Alternatively, or in addition, the assistant server(s) may recommend one or more specific mappings between VR inputs and commands, based on data obtained from other VR modules and plugins. These mappings may also be fine-tuned, as well as adapted, based on user behavior, e.g., as described with reference to block 650.

As an example, a plugin developer for a music player plugin can program relevant commands, e.g., change volume, change music being played, etc., while developing the plugin. The plugin developer may at a later time create or change mappings to those commands from VR inputs, for example, a thumb's-up to increase volume, an icon touch gesture to change music, etc.

Furthermore, if an assistant server has adaptively learned from other plugins (e.g., by communications over channel 1020$a$) that a specific VR input (such as a gesture) typically corresponds to user intent to raise volume, block 611 of the assistant server can suggest or supply that VR input to the music player plugin in the above example to correspond to the Command to raise volume.

In some cases, mappings between VR inputs and commands may be adapted based on subconscious user behavior. If the user consistently performs certain actions unconsciously, such actions may be picked up by sensors in the input module 320, and may be register as distinct VR inputs, even when the user does not intentionally perform those inputs to generate any corresponding commands.

For example, if a user consistently attempts to move sideways in VR street 101, block 611 might record this attempt to move and make such sideways motion a supported VR input gesture corresponding to the command to move sideways. This interpretation of VR inputs can also be context dependent. For example, gestures that correspond to one or more commands for one or more VR modules when user A is accompanied by user B in a joint VR environment may correspond to different commands for those same VR modules when user A is instead accompanied by user C. In particular, VR input gestures corresponding to one or more commands when a user is using VR street 101 might correspond to different commands when the same user is using VR drive 201.

VR inputs can also have different meanings within a single plugin, for different internal contexts within the plugin. For example, in VR street 101, a VR input (e.g., a gesture or movement of the user's feet) may cause sideways movement when the user is virtually walking outdoors, but the same VR input may cause the user to enter a virtual building if the user is near a virtual building. In this example, the virtual location of the user in the VR experience corresponds to a context used to interpret one or more VR inputs.

Figure 7:
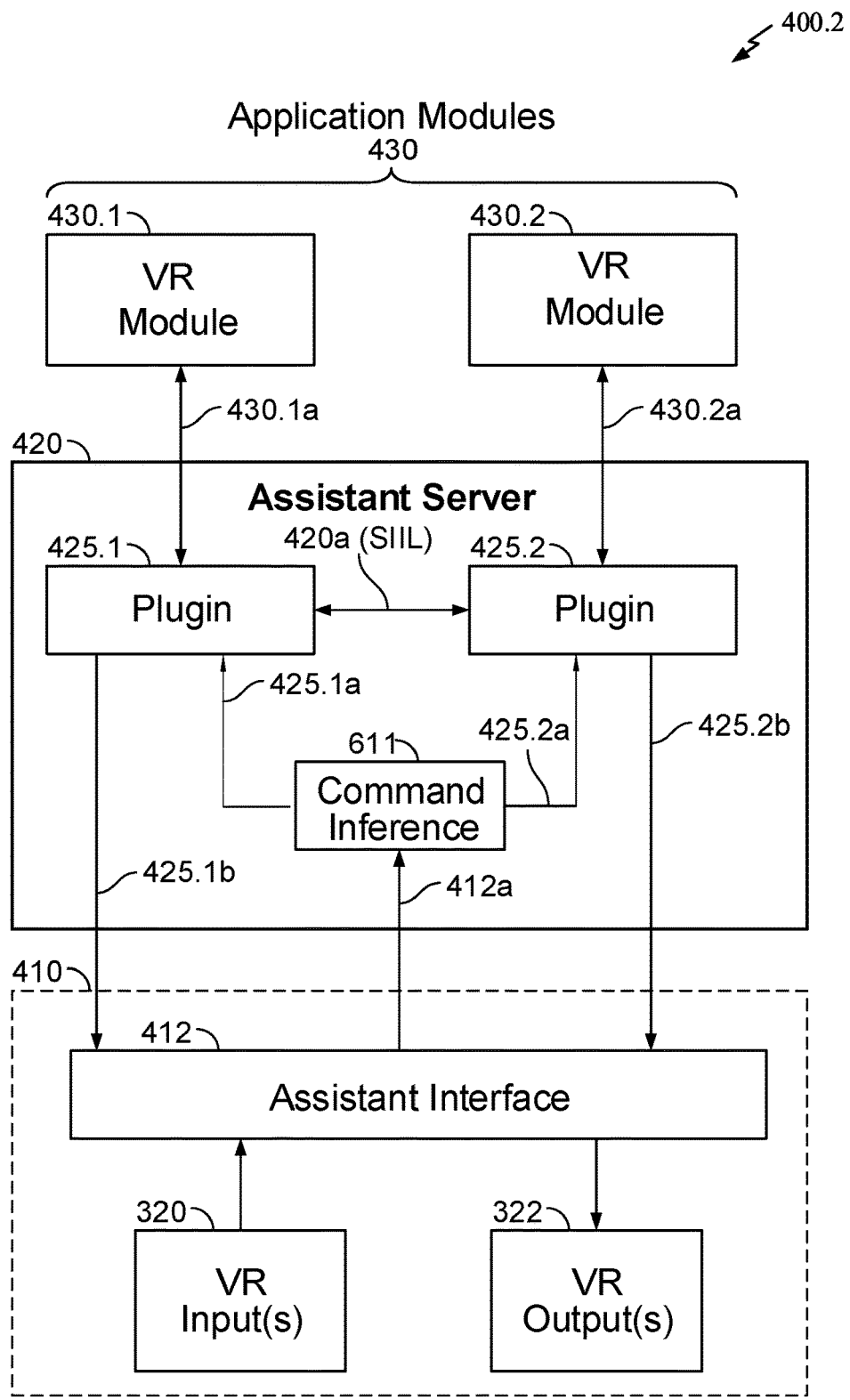
FIG. 7 illustrates an exemplary embodiment of the VR system, wherein the application modules are VR modules.

FIG. 7 illustrates an alternative exemplary embodiment 400.2 of VR system 400, wherein application modules 430.1 and 430.2 are both VR modules. Note FIG. 7 is shown for illustrative purposes only, and is not meant to limit the scope of the present disclosure. The functioning of exemplary embodiment 400.2 may be described with reference to a scenario in which module 430.1 implements VR street 101, and module 430.2 implements VR drive 201.

In this scenario, to provide for a smooth and "seamless" transition between VR street 101 and VR drive 201, module 430.2 may be designed to incorporate certain elements and parameters of VR street 101 into VR drive 201. For example, certain aspects of the scenery of VR street 101 may be incorporated into the scenery displayed in VR drive 201.

In this case, module 430.2 can request module 430.1 to provide parameters for VR street 101, by sending a proprietary request message to plugin 425.2 over channel 430.2$a$. Plugin 425.2 translates the proprietary request message into an SIIL message, and transmits the SIIL message to plugin 425.1, which translates the message into a proprietary request message for module 430.1, and transmits the message to module 430.1 over channel 430.1a. The requested data can then be generated by module 430.1, and sent back to module 430.2 over the same communications channel (e.g., 430.1a, 420a, 430.2a, etc.). Thus it will be appreciated that communication channel 420a between plugins 425.1, 425.2 allows transfer of SIIL messages encapsulating parameters used for generating "seamless" transitions between the VR experiences generated by such VR modules.

Alternatively, data transferred over channel 420a may include credentials or authorizations associated with payment instruments which may travel with a user as the user transitions between VR environments. For example, the authority to use a certain type of payment instrument (e.g. charge transactions to the payment instruments) may accompany the user as the user moves between different VR experiences. This may be implemented by allowing plugins 425.1, 425.2 corresponding to those different VR experiences to exchange payment credentials and authorization data over channel 420a using SIIL messages.

Further data that may be transferred over channel 420a may include information about a user's current or "assigned" status, e.g. with respect to rewards programs or the user's achievement of a predefined status, that may be relevant to VR experiences generated by each VR module. For example, each plugin may have its own definition of what a particular status means. Sharing or providing data about such user status allows users to build on past experiences between plugins. For example, one or more users may move their intensive play in a first VR game experience to a second VR game experience, to give the one or more users a higher starting point in the second VR game.

Figure 8:
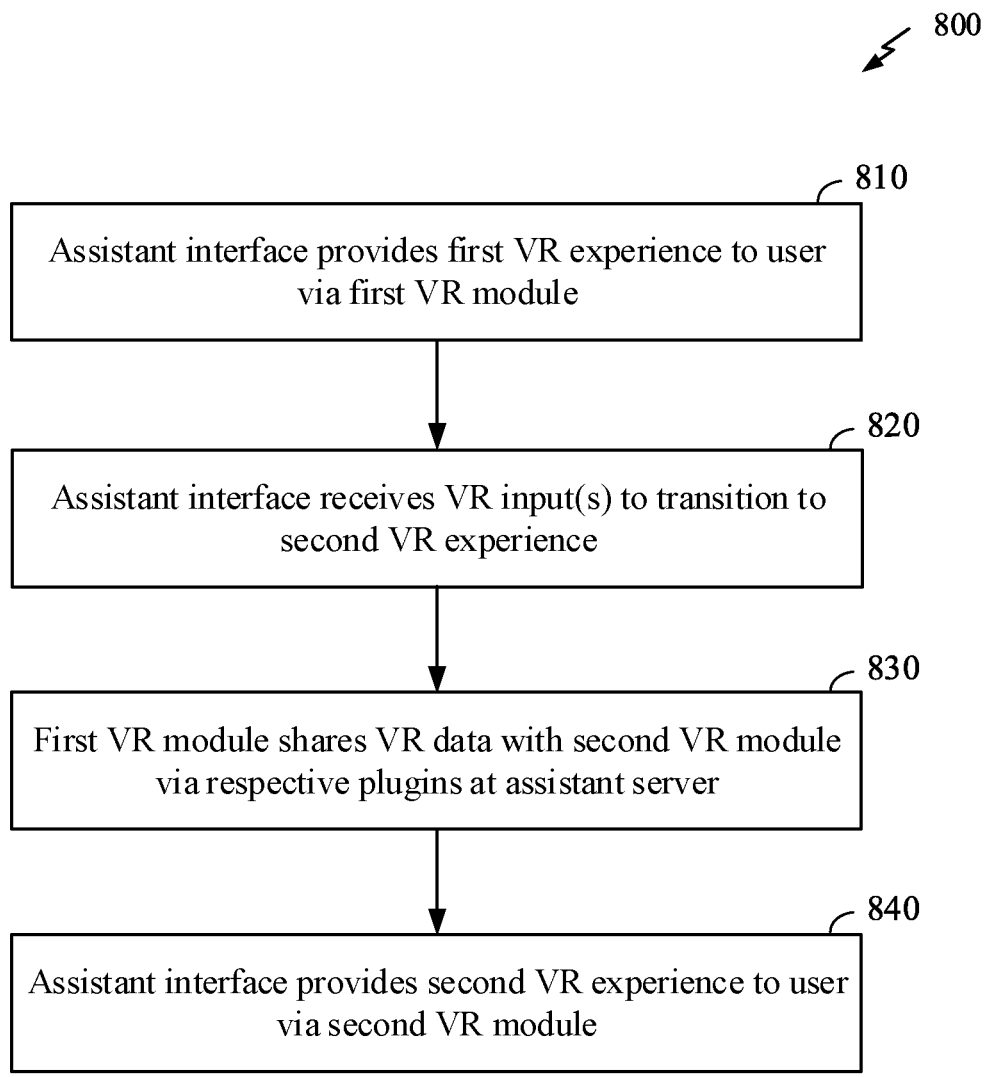
FIG. 8 illustrates an exemplary embodiment of a method utilizing the VR system to provide seamless transitions amongst multiple, different VR experiences.

FIG. 8 illustrates an exemplary embodiment of a method 800 utilizing VR system 400 to provide seamless transitions amongst multiple, different VR experiences. Note method 800 is shown for illustrative purposes only, and is not meant to limit the scope of the present disclosure.

In FIG. 8, at block 810, assistant interface 412 provides a first VR experience to the user as generated by first VR module 430.1. In view of the description hereinabove with reference to FIG. 4, it will be appreciated that assistant interface 412 may communicate using SIIL with a plugin, e.g., plugin 425.1, dedicated to first VR module 430.1, and thus receive the parameters needed to generate VR output for output module 322 according to VR output generated by first VR module 430.1.

At block 820, assistant interface 412 receives an indication to transition from the first VR experience to a second VR experience implemented by VR module 430.2. In an exemplary embodiment, such indication may derive from, e.g., VR inputs from input module 320 by a user signaling intent to transition from one VR experience to another. For example, in an exemplary embodiment wherein a user desires to transition from VR street 101 to VR drive 201, the user may gesture toward a virtual car door present in VR street 101, which may provide the indication to assistant interface 412 to transition between VR experiences.

At block 830, first VR module 430.1 shares VR data and parameters with second VR module 430.2, via their respective plugins 425.1, 425.2. In particular, VR module 430.1 may communicate relevant VR parameters using its proprietary protocol to plugin 425.1, which translates such VR parameters into an SIIL message. Plugin 425.1 transmits the translated SIIL message to plugin 425.2 over channel 420a, which translates the message to a proprietary protocol of second VR module 430.2. In this manner, VR module 430.2 may access the VR parameters associated with the first VR experience, and incorporate those VR parameters into the second VR experience to thereby make the transition between VR environments appear seamless to the user.

At block 840, assistant interface 412 provides the second VR experience to the user via second VR module 430.2.

In an exemplary embodiment, any or all of communications channels 412a, 425.1b, 425.2b may be implemented as Wi-Fi, Wi-Fi direct, Near-field communication, Bluetooth, radio frequency identification (RFID), Ethernet, FireWire, universal serial bus (USB), high definition multimedia interface (HDMI), or any other type of wireless or wired connection, etc.

In an exemplary embodiment, one or more of application modules 430 may be configured to provide a "general platform" functionality for VR system 400. In particular, as earlier described with reference to FIG. 3, it would be desirable to maintain a single background control panel and framework across all VR experiences, such that, e.g., a particular user hand gesture would bring forth a "home menu," or other general functionality such as "increase VR environment audio output volume." As such, one or more of application modules 430 may be configured to monitor user inputs for such general platform input as hand gestures or other keyword commands, and take action responding to such input. For example, a specific user input such as a particular pre-defined hand gesture may be encoded by assistant interface 412 into an SIIL message that signals a user intent to transition from a first VR experience to a second VR experience.

General platform functionality for VR system 400 may further include projecting a virtual representation of the VR system 400 as a virtual assistant in the VR environment. For example, the presence of client 410 of the VR system 400 can be virtually embodied as an icon or avatar or in some other way in the VR environment, e.g., VR street 101, and the user may be able to interact with the client embodiment, e.g. talk to or gesture to the client avatar.

For example, the client may be embodied as a bird that the user perceives in the VR environment, and with which the user can interact directly, e.g., to provide with one or more user-generated VR inputs and/or receive from the bird feedback from other VR modules. Presented in this fashion, a particular user's client may be perceivable only by that user, or alternatively may be perceivable by one or more other users participating in a joint VR experience, as further described hereinbelow with reference to FIG. 9. A user's client can also be present and monitoring the user, for a limited duration or permanently, without being personified or even perceivable by the user at all. In other words, the user may not be consciously aware of their client's presence in a VR session, although the client may in such cases still be monitoring the user's actions and accepting VR inputs based on the user's actions.

In an alternative exemplary embodiment, general platform functionality for VR system 400 may further or instead be provided by assistant interface 412. For example, assistant interface 412 may include one or more decision modules for directing VR inputs received from input module 320 to an appropriate one or ones of application modules 430, and/or providing an overall graphic and user interface for VR system 400, including projecting a virtual representation of the VR system 400 as a virtual assistant in the VR environment, as described hereinabove. Such alternative exemplary embodiments are contemplated to be within the scope of the present disclosure.

In an alternative exemplary embodiment, general platform functionality may be coordinated amongst multiple individual application modules by exchange of SIIL messages. For example, certain parameters defining a general meaning of a given general hand gesture (e.g., "increase VR audio output volume") may be exchanged between application module 430.1 and application module 430.2 as SIIL messages, and in this manner, a general unified VR environment may be provided without the need to configure any single module of modules 430 to understand and process a complex set of VR inputs.

In an exemplary embodiment, any components of modules 320, 322 may incorporate translation functionality associated with assistant interface 412 into the hardware/software implementation of module 320 or 322, and thus assistant interface 412 need not be separately implemented from either module 320 or module 322. Such alternative exemplary embodiments are contemplated to be within the scope of the present disclosure.

Further aspects of the present disclosure provide for accommodating interaction between multiple users of a VR system in a joint VR environment using the techniques disclosed herein. FIG. 9 illustrates an exemplary VR scenario 900 accommodating multiple users according to the present disclosure. Note FIG. 9 is shown for illustrative purposes only, and is not meant to limit the scope of the present disclosure. For ease of illustration, VR scenario 900 omits certain hardware blocks such as computer 102, although it will be appreciated that such elements and others not explicitly described are present in any actual implementation.

Figure 9:
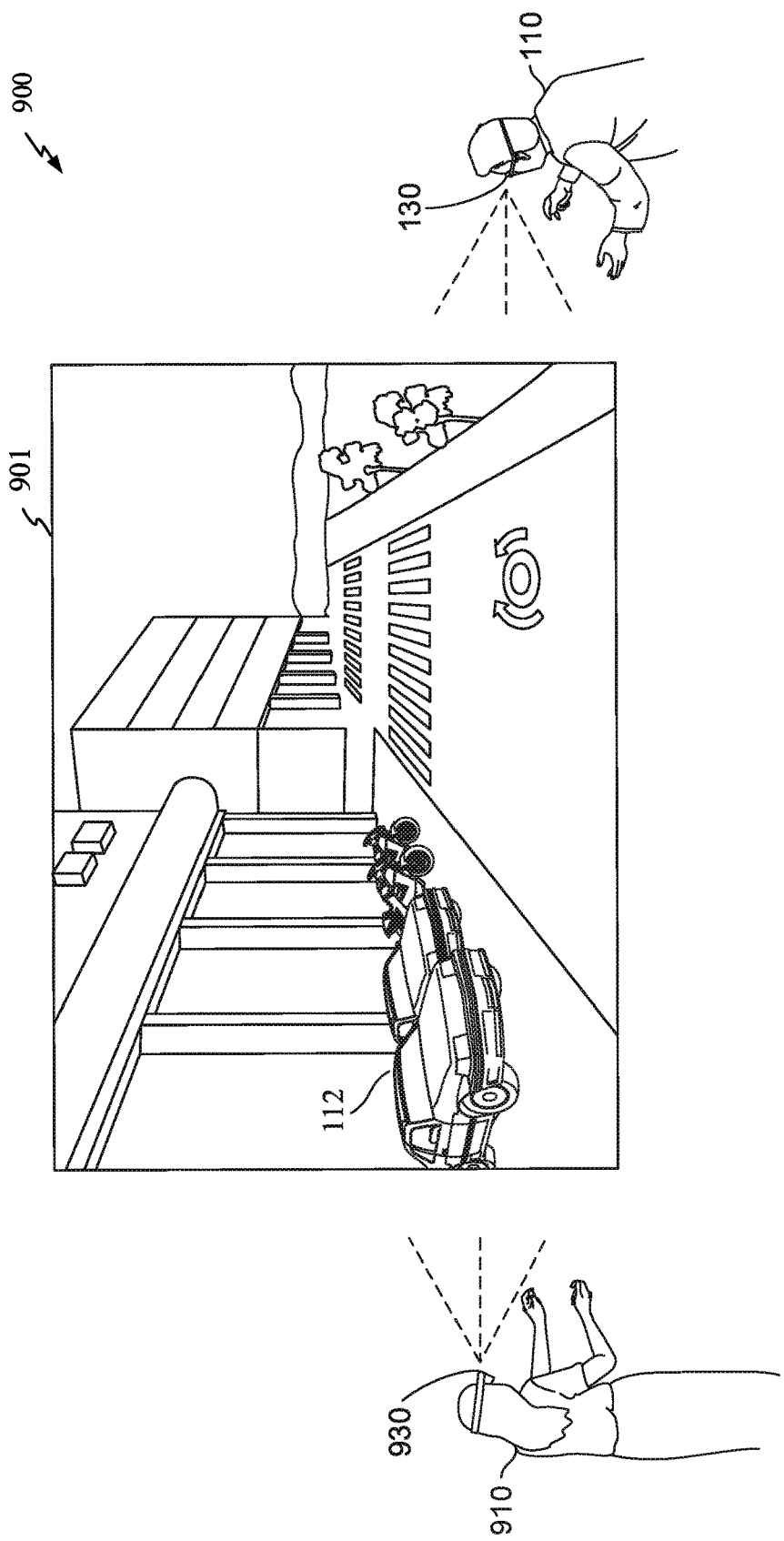
FIG. 9 illustrates an exemplary VR scenario accommodating multiple users according to the present disclosure.

In FIG. 9, first user 110 and second user 910 are simultaneously engaged in a "joint" VR experience 901, also referred to herein as "joint VR street." In particular, a joint VR experience may be one in which multiple users may be immersed in respective VR environments sharing at least some of the same parameters, e.g., imagery, audio, context, etc., and further in which the users may be provided some opportunity to interact with each other. For example, in joint VR street 901, both users 110, 910 may be immersed and virtually present in joint VR street 901 through receipt of respective output signals, e.g., generated by VR headsets 130, 930, audio speakers (not shown), etc. In an exemplary embodiment, the VR system may be configured to enable users 110, 910 to interact with each other and with the virtual environment.

For example, a virtual avatar (not shown) representing one of the users may be generated and projected by the VR system into VR environment 901, and other user(s) may view and interact with such avatar as in real life. For example, first user 110 may speak to second user 910 by facing the avatar (not shown) corresponding to second user 910 in VR environment 901, and by speaking directly into a microphone or another audio input device. First user 110 and second user 910 may also jointly interact with other objects present in VR environment 901. For example, first user 110 may approach a driver's side of virtual car 112 and open the door, while second user 910 may simultaneously approach a passenger's side of virtual car 112 and open the door. In this instance, the VR system may interpret the users' inputs as indicating that both users desire to take part in the same joint driving simulation, such as student and teacher in a driving instruction simulation. The VR system may thus arrange for joint street environment 901 to transition to joint driving VR environment (not shown), in which two (or more) users may participate.

FIG. 10 illustrates an exemplary embodiment of a joint VR system 1000 according to the present disclosure. Note FIG. 10 is shown for illustrative purposes only, and is not meant to limit the scope of the present disclosure. For example, while two sub-systems 1001, 1002 are illustratively shown in FIG. 10 for illustrative purposes, it will be appreciated that the techniques described herein may readily accommodate more than two sub-systems, and such alternative exemplary embodiments are contemplated to be within the scope of the present disclosure. Furthermore, it will be understood that each of clients 410.1, 410.2 may share a similar architecture to that described for client 410 in, e.g., VR system 400 of FIG. 4.

In FIG. 10, VR system 1000 includes two sub-systems: first sub-system 1001 for first user processing, and second sub-system 1002 for second user processing. Each of first sub-system 1001 and second sub-system 1002 may include similar features as VR system 400 for a single user and multiple VR modules, as described hereinabove with reference to FIG. 4. Accordingly, similarly labeled elements in VR system 400 and sub-systems 1001, 1002 may refer to elements performing similar functionality, unless otherwise noted.

In FIG. 10, each of first sub-system 1001 and second sub-system 1002 receives VR inputs from clients 410.1, 410.2, e.g., from first and second users, respectively. Assistant server 420 of first sub-system 1001 includes a plurality of plugins 425.1, including VR plugin 425.1-1 coupled to first VR module 430.1-1 and non-VR plugin 425.1-2 coupled to non-VR module 430.1-2. Assistant server 420 of second sub-system 1002 includes a plurality of plugins 425.2, including VR plugin 425.2-1 coupled to second VR module 430.2-1 and non-VR plugin 425.2-2 coupled to non-VR module 430.2-2. Data may be exchanged between application modules (i.e., VR or non-VR modules) of first sub-system 1001 and second sub-system 1002 by configuring their respective plugins to communicate such data using SIIL messages over communications channel 1030a. Channel 1030a may include any link facilitating information transfer between assistant server 420 of first sub-system 1001 and assistant server 420 of second sub-system 1002, and may include, e.g., a wired or wireless Internet or local-area network connection, etc.

In FIG. 10, assistant servers 420 of first sub-system 1001 and second sub-system each include an instance of command inference block 611. Block 611 receives signals from its respective client 410.1 or 410.2, e.g., signals encapsulated as user-input SIIL messages. Block 611 may convert user-input SIIL messages into command-input SIIL messages, as previously described hereinabove with reference to FIG. 6. Block 611 further provides the command-input SIIL messages to the respective plugins.

In an exemplary embodiment, VR modules 430.1-1, 430.1-2 may correspond to separate modules configured to generate a single joint VR experience for multiple users. FIG. 11 illustrates an exemplary embodiment 1100 of a method for generating a joint VR experience using VR system 1000 according to the present disclosure. In the manner described hereinbelow, it will be appreciated that method 1100 provides the capability for VR users to "interact" with each other in a joint VR experience. Note FIG. 11 is shown for illustrative purposes only, and is not meant to limit the scope of the present disclosure.

Figure 11:
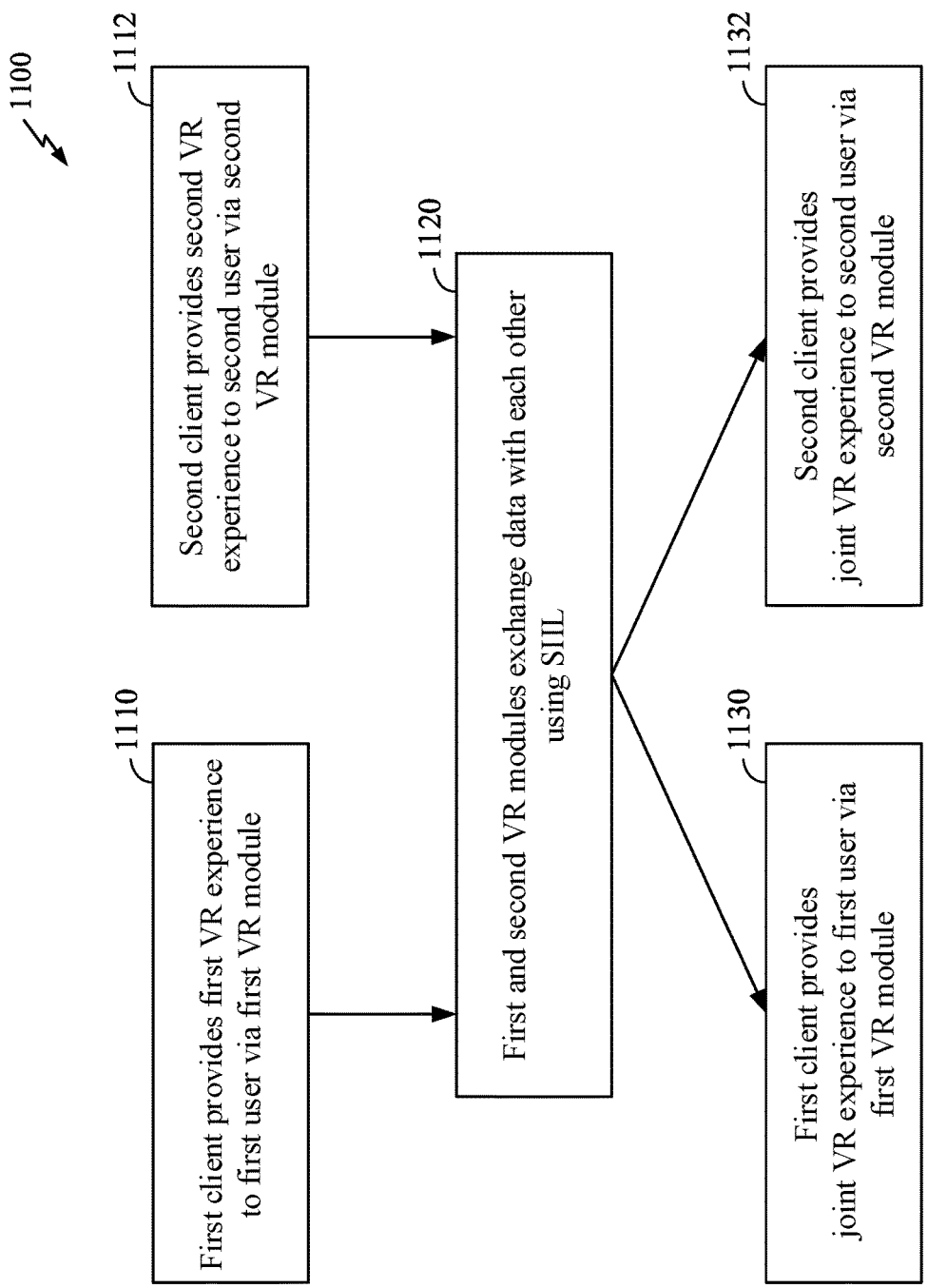
FIG. 11 illustrates an exemplary embodiment of a method for generating a joint VR experience using the joint VR system according to the present disclosure.

In FIG. 11, at block 1110, a first client provides a first VR experience to a first user via a first VR module. In an exemplary embodiment, such operations may be implemented by client 410.1 providing a first VR experience to first user 110 generated by first VR module 430.1-1. In particular, client 410.1 may communicate with VR module 430.1-1 via SIIL, e.g., using plugin 425.1-1.

At block 1112, a second client provides a second VR experience to a second user via a second VR module. In an exemplary embodiment, such operations may be implemented by client 410.2 providing a first VR experience to first user 110 generated by first VR module 430.1-1. In particular, client 410.1 may communicate with first VR module 430.1-1 via SIIL, e.g., using plugin 425.1-1.

At block 1120, the first and second VR modules exchange data with each other via the first and second assistant servers using SIIL. In an exemplary embodiment, such operations may be implemented by first VR module 430.1-1 and second VR module 430.2-1 exchanging data with each other over channel 1030a, i.e., via their respective plugins.

By exchanging data over channel 1030a, the first VR module 430.1-1 may receive data relevant to the second user to generate the first VR experience for the first user, and also transmit data relevant to the first user to allow the second VR module 430.2-1 to generate the second VR experience for the second user. Similarly, the second VR module 430.2-1 may also transmit and receive data to and from the first VR module 430.1-1. In this Specification and in the Claims, the arrangement of two or more assistant servers communicating with each other is referred to as there being "multiple instances" of the assistant server.

In an exemplary embodiment, the first VR module may receive data over channel 1030a, e.g., reference coordinates from the second VR module that align frames of reference of the VR environment, and/or synchronize the timing of VR frames and/or audio, presented to the first and second users. The first VR module may further receive over channel 1030a parameters, e.g., spatial coordinates, profile information, etc., corresponding to a second user being supported by the second VR module.

At block 1130, the first client provides a joint VR experience to the first user via the first VR module 430.1-1. In particular, the first VR module 430.1-1 may use the parameters received over channel 1030a at block 1120 to simulate the presence of the second user in the VR environment displayed to the first user. For example, using the received parameters, the first VR module 430.1-1 may generate an avatar corresponding to the second user in the first VR environment for the first user, and may further provide characteristics to the avatar corresponding to the profile parameters of the second user as received over channel 1020a.

At block 1132, the second client provides a joint VR experience to the second user via the second VR module 430.2-1. In particular, similar operations may be performed at the second VR module 430.2-1 to generate the second VR experience for the second user as are performed at block 1130 by the first client and first VR module.

It will be appreciated that multiple instances of assistant servers 420 may exchange various types of information with each other to facilitate interaction between users of the VR system. Such information may include, but is not limited to, user preferences, inputs entered by the user (e.g., allowing one assistant server to understand the user inputs of another assistant server), and "contexts" for command inference, as previously described hereinabove with reference to FIG. 6. In this manner, entered commands by multiple different users can be communicated amongst and understood by the multiple instances of the assistant server.

While separate users are shown as connecting to different assistant servers 420 in FIG. 10 (e.g., a first user accesses assistant server 420 of first sub-system 1001, while a second user accesses assistant server 420 of second sub-system 1002), in alternative exemplary embodiments, multiple users may access the same assistant server 420. In such an exemplary embodiment, a single assistant server 420 may simultaneously support multiple plugins, and SIIL communications between such plugins may be conducted within the same assistant server 420, e.g., internally within assistant server 420 using hardware bus cables, network connections, or local-area type network connections.

In an alternative exemplary embodiment of the present disclosure, using a VR system having characteristics of VR system 400.1 and VR system 1000, a user may build a collection of items on one service, for instance, and then that list could be distributed across several other services. For instance, over some period of time on Rotten Tomatoes™, a user might assemble a list of movies they wish to watch. This list of movies could then be distributed across movie services, e.g. Netflix™, Hulu Plus™, Amazon Instant™ and other services, based on the availability of movies in the respective services. Such lists of items (movies in this example) can also be collaboratively built by multiple users working together, e.g., in a joint VR environment that records tasks or lists completed jointly by multiple participants.

In an alternative exemplary embodiment, VR system 1000 may further support a joint VR environment for two or more users that functions as a VR interface to one or more non-VR services. For example, VR modules 430.1-1, 430.2-1 may generate a joint VR environment such as a virtual meeting place for two or more users. A first user served by first sub-system 1001 may select a movie title from a non-VR module 430.1-2, such as a movie service accessible by the first user (for example, Hulu Plus™), and share the movie title with a second user served by second sub-system 1002 by generating a user input in the virtual meeting place. The second user may, upon being notified of the title of the shared movie, check on the availability of the movie in a different non-VR module, e.g., non-VR module 430.2-2 implementing a movie service (for example, Netflix™) that the second user has access to. In such a scenario, data corresponding to the shared movie title may be exchanged between plugins over channel 1030a, e.g., between VR plugin 425.1-1 serving the first user and VR plugin 425.2-1 serving the second user, etc.

In an exemplary embodiment, the performance of certain commands by any VR module may be conditioned on user pre-authorization. For example, opening a car door in car 112 of VR street 101 to transition to VR drive 201 may be performed only in response to a user possessing and demonstrating the requisite authorization to access VR drive 201. In an exemplary embodiment, a user of a VR module may share authority to access a VR environment with other users, e.g., utilizing channel 1030a for exchanging such data between plugins. Similarly, a user can choose to share authority over different aspects of a VR environment with one or more other users according to some predetermined limitations, e.g., only for a given duration, or subject to other conditions.

For example, in a scenario wherein two or more users participate in joint VR street 901, only a first user may possess the authority to transition from the virtual street experience to the virtual drive experience. (For example, the first user may have paid for a subscription account to the virtual drive simulator.) In this case, the first user may extend authority to the second user on a limited basis, e.g., by generating a VR input such as a gesture or voice command. As another example, in a VR shopping environment wherein a user can select virtually displayed items for purchase, only a first user may be authorized to make purchases. In this case, the first user might also extend authority to a second user or other users to also make purchases, subject to, e.g., limitations on the amount that can be spent, etc.

In a further exemplary embodiment, in a VR meeting environment, multiple users may jointly participate in reviewing a single asset, e.g. a document. A first user, corresponding to the legal owner of that asset, can generate a VR input to extend viewing and/or editing authority to other users. The first user may further choose to assign different levels of authority (e.g., viewing authority, editing authority, etc.) to different users, which authority can further be revoked at any time by the first user.

In a specific exemplary embodiment of multi-user bundled VR inputs referred to herein as "pooled authority," multiple users may be required to collectively signal their individual authorizations to perform a single command. For example, there could be games where different users have paid for different segments of a game (or multiple interconnected games) but can extend the authority to play in those segments to one another. In those situations, the VR system of the present disclosure can allow the authority to be pooled. As discussed above, sometimes combined actions can be constructed that involve authority from multiple users also.

In an exemplary embodiment, the VR system may have the capability to support "authority trades," wherein the VR system arranges a simultaneous swap of authority over some underlying asset, for example the authority to issue commands to one or more services, permanently or temporarily, based on an agreement between two or more users. These authority swaps can be simple trades between two people, but complex trades can also be arranged between more than two parties. In the same way, a user may permanently transfer the authority over an underlying asset to another user without receiving anything in return, or in exchange for a transfer of payment. Following such a transfer of authority, the original user loses their authority over the underlying asset. In this way, sales or transfers of access or authority can be made in virtual reality. For example, a user selling their home can transfer their authority over the home's thermostat to a buyer. The virtual assistant system can also hold things (e.g., authority to issue commands to one or more services) in escrow to ensure the transaction is completed properly.

In an exemplary embodiment, VR system 1000 may also be configured to construct parameters of a joint VR session for multiple users based on preferences as expressed by the users. For example, the specific color settings, scenery, audio backgrounds and other aspects of a joint VR experience may be constructed, e.g., by exchanging data amongst the multiple plugins, and/or other VR or non-VR plugins not shown, using SIIL messages. For this purpose, there could be multiple instances of the assistant server running in the different users' VR systems, e.g., each user may have their own assistant server, in communication with one or more other users' assistant servers in the manner described above.

While aspects of the present disclosure have been described with reference to VR, it will be appreciated that the techniques described may also be applied to augmented reality ("AR") systems, which will be understood herein to refer to a type of VR system. In particular, in AR, the user is also presented with a virtual environment, with the additional condition that the user may still perceive their immediate surroundings, and only additional graphics or other overlays may be provided. For example, a user trying to follow directions to a destination may perceive an arrow on the ground, guiding the user towards the destination. It will be understood that the inventive concepts presented herein are equally applicable to AR. For example, AR systems may generally adopt the same modules and architectures as described herein, e.g., assistant interface, assistant server with command inference block, multiple plugins, etc.

An AR experience may be provided, for example, through glasses that allow the user to see normally but also display images in the user's field of view. Alternatively, or in addition, the user may be watching for example a real-time or time-delayed camera feed, in which additional elements are displayed for viewing. An AR experience may also provide additional data to one or more users' other senses, for example via audio signals or haptic feedback.

As described hereinabove, the interpretation of user inputs and the actions performed in AR may also depend on the accompanying context. In AR, however the contexts can include the user's immediate environment. As such, the virtual assistant system may include or be connected to, for example, cameras and other sensors that detect the user's surroundings and allow the virtual assistant system to react thereto. As an example, if there is an intruder in the user's home, a camera of an AR experience—such as a camera included in the glasses described above—may capture an image of the invader's face, and report it to the authorities. This image capture and report function may be performed in response to a conscious or unconscious action on the part of the user.

Figure 12:
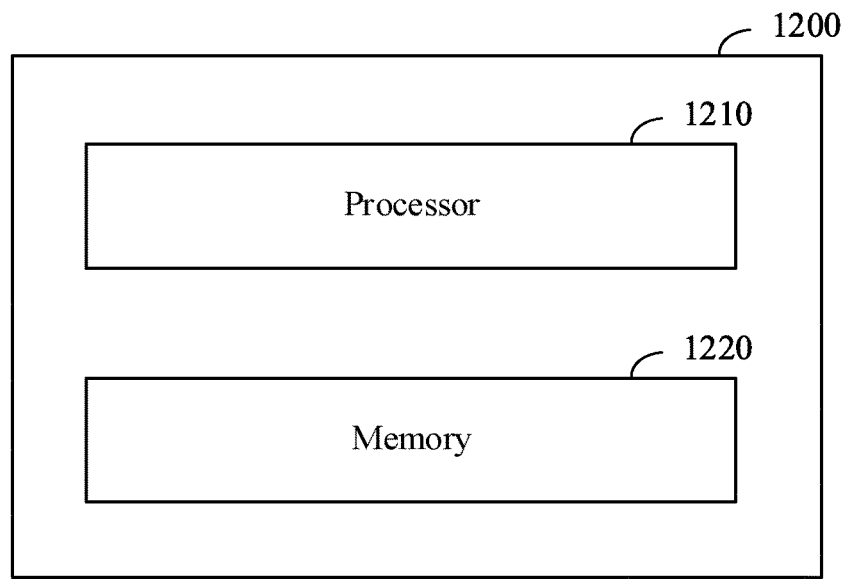
FIG. 12 illustrates an exemplary embodiment of a computing device according to the present disclosure.
Figure 13:
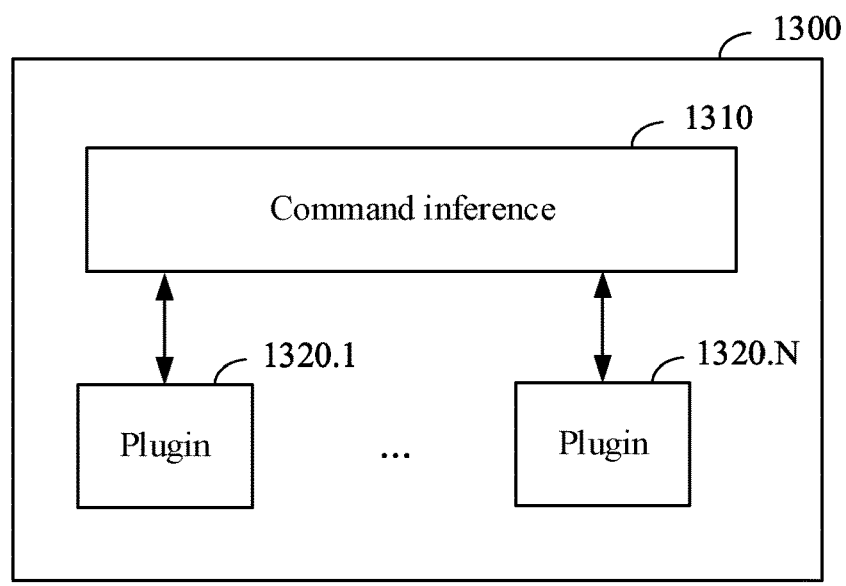
FIG. 13 illustrates an exemplary embodiment of an apparatus according to the present disclosure.

FIG. 12 illustrates an exemplary embodiment of a computing device 1200 including a memory 1220 holding instructions executable by a processor 1210 to receive from a client a user-input message according to a first protocol specifying an input to a virtual reality system; convert the user-input message into a command-input message according to the first protocol; transmit a command input specified by the command-input message to an application module; translate a custom service message received from the application module into a first service message according to the first protocol; and transmit the first service message to the client.

HG 13 illustrates an exemplary embodiment 1300 of an apparatus according to the present disclosure. Apparatus 1300 includes a command inference block 1310 configured to receive from a client a user-input message according to a first protocol specifying an input to a virtual reality system, and to convert the user-input message into a command-input message according to the first protocol. Apparatus 1300 further includes at least one plugin module 1320 configured to: transmit a command input specified by the command-input message to an application module; translate a custom service message received from the application module into a first service message according to the first protocol; and transmit the first service message to the client.

Figure 14:
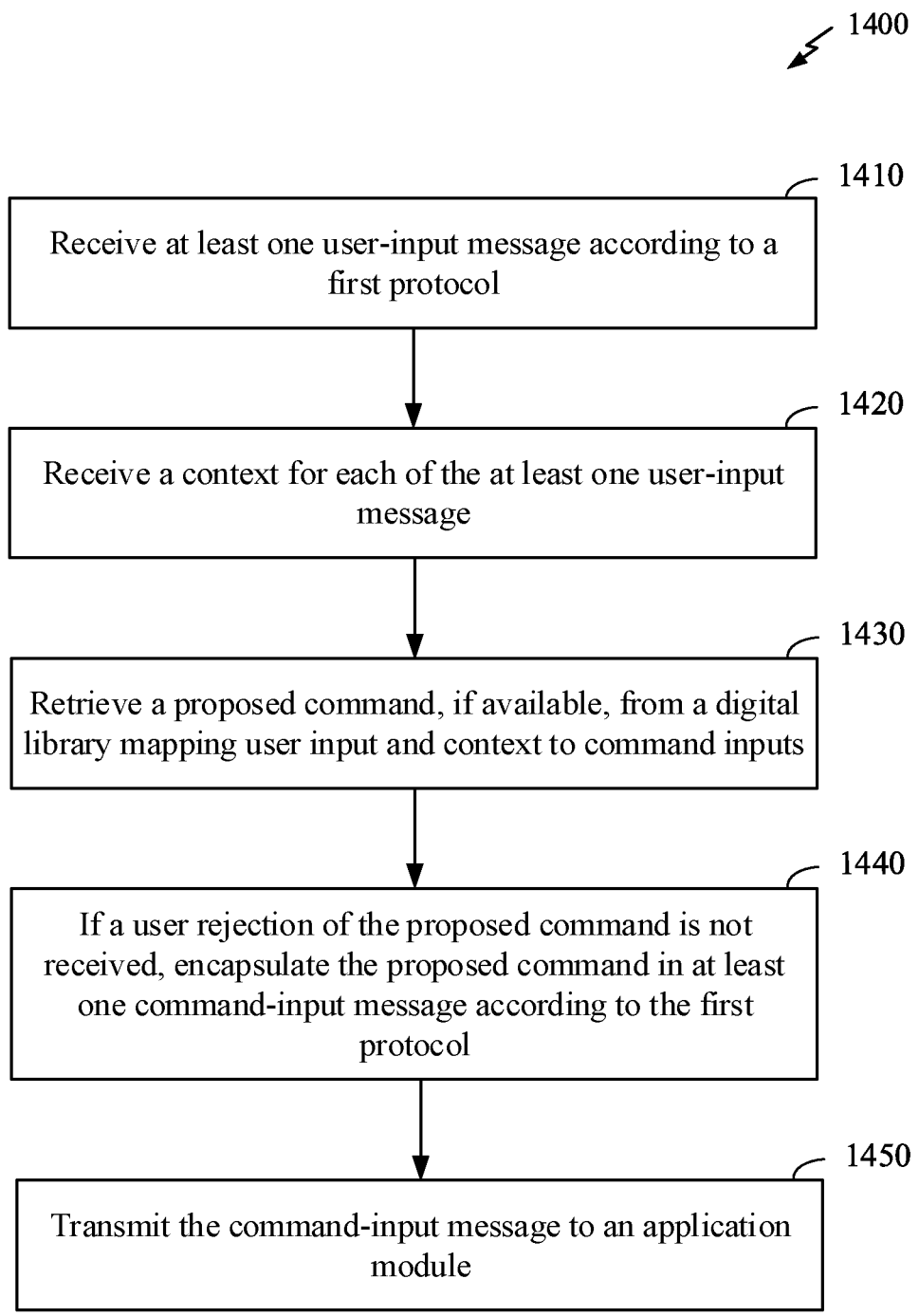
FIG. 14 illustrates an exemplary embodiment of a method for converting a user-input digital message to a command-input digital message for a virtual reality system.

FIG. 14 illustrates an exemplary embodiment 1400 of a method for converting a user-input digital message to a command-input digital message for a virtual reality system. At block 1410, at least one user-input message is received according to a first protocol. At block 1420, a context is received for each of the at least one user-input message. At block 1430, a proposed command is retrieved, if available, from a digital library mapping user input and context to command inputs. At block 1440, if a user rejection of the proposed command is not received, the proposed command is encapsulated in at least one command-input message according to the first protocol. At block 1450, the command-input message is transmitted to an application module.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A server apparatus comprising a central processing unit (CPU), and a storage unit storing instructions executable by the CPU, the instructions configured to implement:
    a command inference block configured to, using a communicator, receive from a client a user-input message according to a universal protocol specifying an input to a virtual reality system, and to convert the user-input message into a command-input message according to the universal protocol; and
    at least one plugin module configured to:
    transmit using a communicator a command input specified by the command-input message to an application module;
    translate a custom service message received from the application module into a universal service message according to the universal protocol; and
    transmit using a communicator the universal service message to the client.

2. The apparatus of claim 1, the user-input message specifying at least one of a gesture performed by the user and a voice input.

3. The apparatus of claim 1, the command inference block configured to convert the user-input message into the command-input language by being configured to:
    receive a context of the user-input message;
    retrieve a proposed command from a library based on the received context and the user-input message; and
    encapsulate the proposed command in the command-input message.

4. The apparatus of claim 1, the context comprising at least one of co-presence of other individuals in a joint VR environment when one user generates an input, the user's geographic location when generating the input, a time of day when the user input is made, and a direction in which a physical input such as a gesture is made.

5. The apparatus of claim 1, the command inference block configured to convert the user-input message into the command-input language by being configured to:
    receive a context of the user-input message;
    retrieve a proposed command from a library based on the received context and the user-input message;
    if a rejection of the proposed command is received from the user, encapsulate another command suggested by the user in the command-input message; and
    update the library based on the another command suggested by the user.

6. The apparatus of claim 1, the command inference block configured to convert the user-input message into the command-input language by being configured to:
    receive a context of the user-input message;
    retrieve a proposed command from a library based on the received context and the user-input message;
    if the library does not contain a proposed command based on the received context and the user-input message, encapsulate another command suggested by a second user in the command-input message; and
    update the library based on the another command suggested by the second user.

7. The apparatus of claim 1, the command inference block configured to convert the user-input message into the command-input language by being configured to:
    receive a plurality of user-input messages from a plurality of users; receive a context of each user-input message;
    retrieve a proposed command from a library based on the plurality of received contexts and the plurality of user-input messages; and
    encapsulate the proposed command in the command-input message.

8. The apparatus of claim 1, the at least one plugin module comprising a first virtual reality (VR) plugin and a second non-virtual reality (non-VR) plugin, the first VR plugin configured to exchange at least one parameter of the user with the second non-VR plugin using a message according to the universal protocol, the at least one parameter comprising a credential or authorization associated with a payment instrument owned by the user, an assigned status of the user, and a user profile.

9. The apparatus of claim 1, the at least one plugin module comprising a first virtual reality (VR) plugin and a second virtual reality (VR) plugin, the first VR plugin configured to exchange with the second VR plugin using messages according to the universal protocol a virtual environment parameter comprising at least one of a virtual environment coordinate system, relative position of a user in the virtual environment coordinate system, and visual data associated with the virtual environment.

10. The apparatus of claim 9, the first VR plugin configured to exchange data with the second VR plugin using a network communications channel.

11. The apparatus of claim 1, the universal service message comprising an instruction to the client to change an output signal generated by a virtual reality output module.

12. The apparatus of claim 1, further comprising a server computer for implementing the command inference block and the at least one plugin module, the server computer configured to communicate with the client using a network connection.

13. The apparatus of claim 1, the command inference block further configured to receive a second user-input message according to the universal protocol, and to convert the combination of the user-input message and the second user-input message into a single command-input message according to the universal protocol.

14. A method for converting a user-input digital message to a command-input digital message for a virtual reality system comprising a communicator, a central processing unit (CPU), and a storage unit storing instructions executable by the CPU, the method comprising:
receiving using the communicator at least one user-input message according to a universal protocol;
receiving a context for each of the at least one user-input message;
retrieving a proposed command, if available, from a digital library mapping user input and context to command inputs;
if a user rejection of the proposed command is not received, encapsulating the proposed command in at least one command-input message according to the universal protocol; and
transmitting using the communicator the command-input message to an application module.

15. The method of claim 14, further comprising:
if a user rejection of the proposed command is received, encapsulating an alternative command specified by a user in the at least one command-input message according to the universal protocol; and
updating the digital library to map the user input and context to the alternative command specified by the user.

16. The method of claim 14, further comprising:
if the proposed command is not available from the digital library mapping user input and context to command inputs, receiving an alternative command specified by an alternative user; and
encapsulating the alternative command in the at least one command-input message according to the universal protocol.

17. The method of claim 16, the receiving at least one user-input message according to a universal protocol comprising receiving at least one user-input message from each of a plurality of users, the retrieving the proposed command comprising retrieving a single proposed command for the plurality of user-input messages from the plurality of users.

18. A computing device including a communicator, a processor, and a memory holding instructions executable by the processor to:
receive from a client using the communicator a user-input message according to a universal protocol specifying an input to a virtual reality system;
convert the user-input message into a command-input message according to the universal protocol;
transmit using the communicator a command input specified by the command-input message to an application module;
translate a custom service message received from the application module into a universal service message according to the universal protocol; and
transmit using the communicator the universal service message to the client.

19. The device of claim 18, the user-input message specifying at least one of a gesture performed by the user and a voice input.

20. The device of claim 18, the memory further holding instructions executable by the processor to:
receive a context of the user-input message;
retrieve a proposed command from a library based on the received context and the user-input message; and
encapsulate the proposed command in the command-input message.

* * * * *